(12) United States Patent
Matsuzaki

(10) Patent No.: US 7,466,450 B2
(45) Date of Patent: Dec. 16, 2008

(54) IMAGE PROCESSING APPARATUS AND METHOD

(75) Inventor: Masanori Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 11/008,072

(22) Filed: Dec. 8, 2004

(65) Prior Publication Data

US 2005/0128498 A1    Jun. 16, 2005

(30) Foreign Application Priority Data

Dec. 10, 2003    (JP)    ............... 2003-412213

(51) Int. Cl.
*G06F 15/00* (2006.01)
*G03F 3/08* (2006.01)
*H04N 1/46* (2006.01)
*G06K 9/00* (2006.01)

(52) U.S. Cl. .................. 358/1.9; 358/504; 358/515; 358/518; 358/520; 382/162; 382/167

(58) Field of Classification Search .................. 358/1.9, 358/500, 501, 502, 504, 518, 519, 523, 525, 358/520, 515, 3.23; 347/19, 115, 172; 399/72; 702/1; 382/162, 167

See application file for complete search history.

(56) References Cited

U.S. PATENT DOCUMENTS

| | | | | |
|---|---|---|---|---|
| 5,731,989 A | * | 3/1998 | Tenny et al. | 358/1.9 |
| 6,027,201 A | * | 2/2000 | Edge | 347/19 |
| 6,791,716 B1 | * | 9/2004 | Buhr et al. | 358/1.9 |
| 6,891,649 B1 | * | 5/2005 | Kondo | 358/527 |

* cited by examiner

*Primary Examiner*—Edward L Coles
*Assistant Examiner*—Charlotte M Baker
(74) *Attorney, Agent, or Firm*—Canon U.S.A. Inc., I.P. Division

(57) ABSTRACT

An image processing system and method include allowing an output device to output patch-data items of plural multi-order colors represented by a first color space, measuring the color values, in an absolute color space, of the output patch-data items, calculating reference values by converting the plural multi-order colors represented by the first color space based on a first color conversion table containing correspondence between the first color space and the absolute color space, calculating distances between the color values measured by the color measuring means and the reference values, which correspond thereto, and correcting, based on the calculated distances, a second color conversion table containing correspondence between the absolute color space and an output color space.

12 Claims, 19 Drawing Sheets

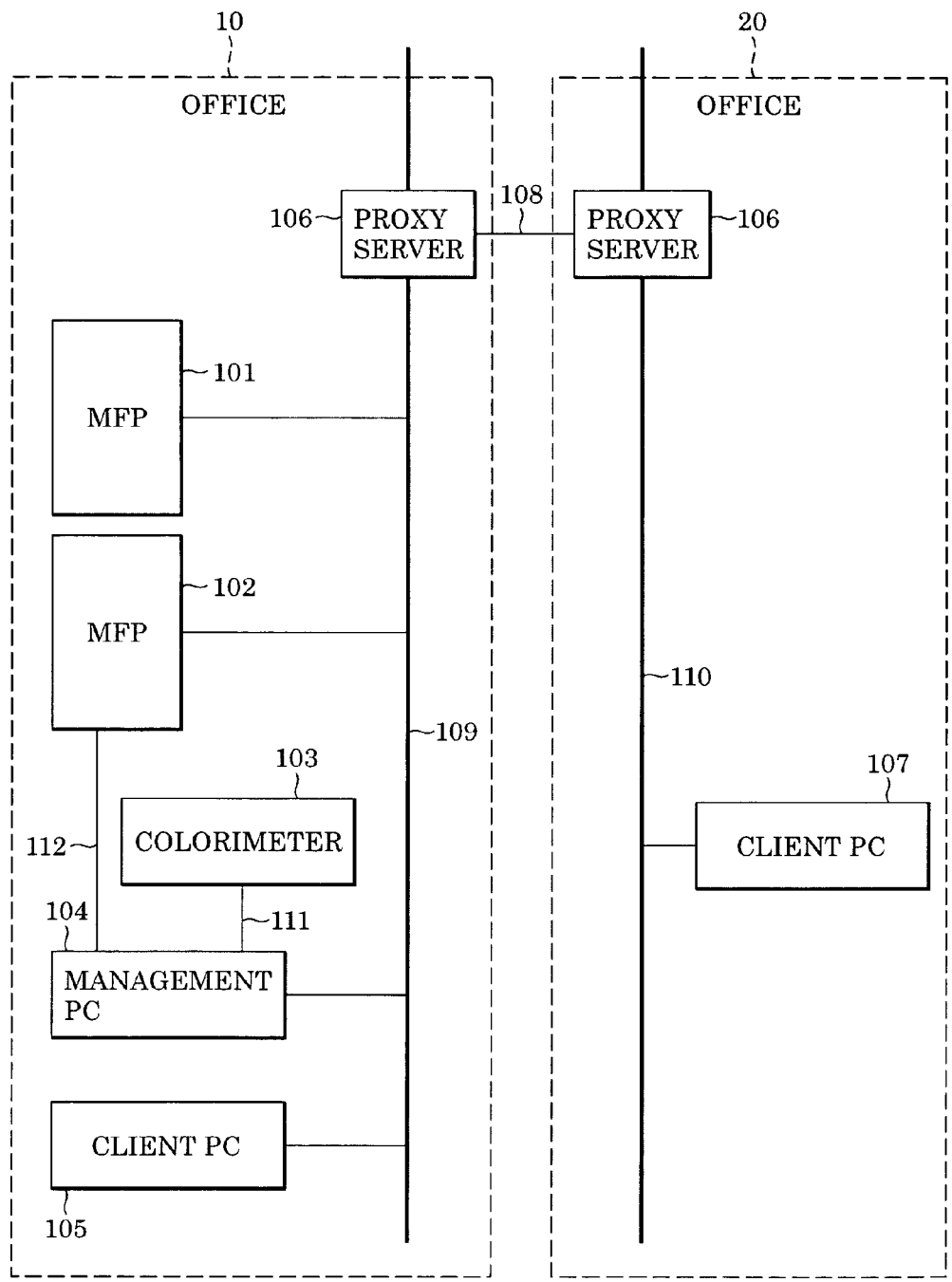

FIG. 6A

CMYK→L*a*b*

| C | M | Y | K | | L* | a* | b* |
|---|---|---|---|---|----|----|----|
| 100 | 100 | 100 | 0 | → | 50 | 0 | 0 |
| 200 | 100 | 100 | 0 | → | 50 | −10 | −10 |
| ⋮ | | | | | ⋮ | | |

FIG. 6B

L*a*b*→CMYK

| L* | a* | b* | | C | M | Y | K |
|----|----|----|---|---|---|---|---|
| 50 | 0 | −10 | → | 120 | 100 | 75 | 50 |
| 50 | 0 | 00 | → | 120 | 100 | 100 | 50 |
| ⋮ | | | | ⋮ | | | |

FIG. 11
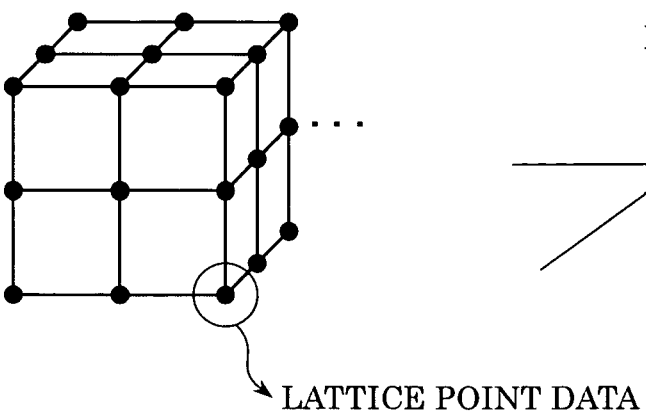
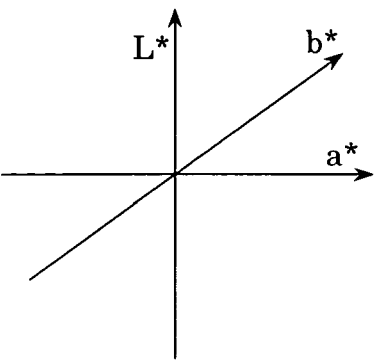
LATTICE POINT DATA
FIG. 12
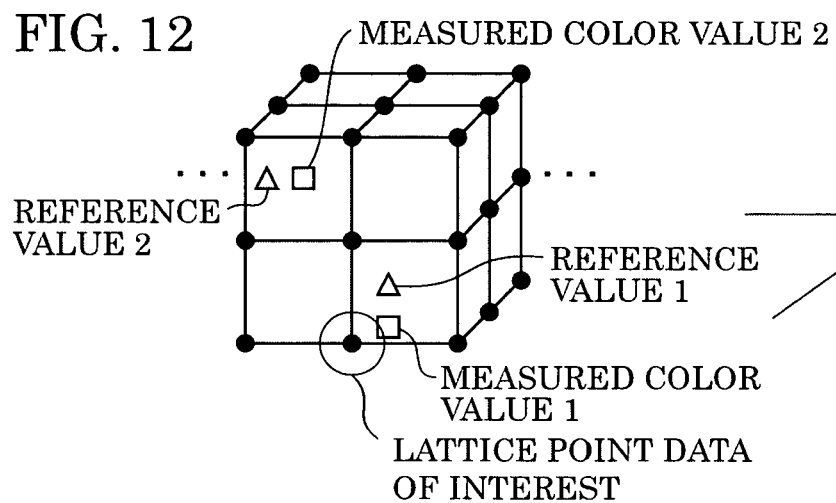
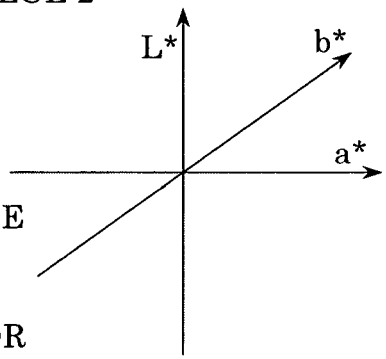
MEASURED COLOR VALUE 2
REFERENCE VALUE 2
REFERENCE VALUE 1
MEASURED COLOR VALUE 1
LATTICE POINT DATA OF INTEREST
FIG. 13
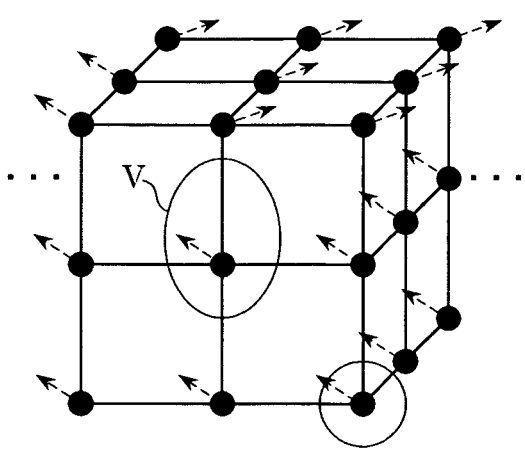

IMAGE PROCESSING APPARATUS AND METHOD

BACKGROUND OF THE INVENTION

1. Field of the Invention

The present invention relates generally to image processing systems and methods and more specifically to image processing systems and methods for performing color management.

2. Description of the Related Art

The importance of color management systems cannot be over-emphasized. With color management systems, color reproduction devices such as scanners, monitors and output devices can be characterized to provide image settings for optimal reproduction. Recently, with widespread colorization of output devices, the importance of a color-management technology for managing color information has become increased. Since different color reproduction devices have different color-reproduction ranges, color image data for one device cannot be directly used in another device. Accordingly, conventional systems are used wherein color image data corresponding to an input color space of an input device is temporarily converted to an absolute intermediate (independent) color space prior to conversion to an output color space of an output device.

FIG. 1 illustrates image data output from the input color space of an input device to the output color space of an output device. Image data is output by using a source profile 202 of the input device to transform the image from the input color space 201 to an absolute color space 203 (intermediate color space). The absolute color space 203 is converted to an output color space 205 by using a destination profile 204. The source profile 202 is a profile based on characteristics of the input device and is used for converting the input color space 201 to the absolute color space 203. The destination profile 204 is a profile based on characteristics of the output device for converting the absolute color space 203 to the output color space 205. At present, standardized format ICC (International Color Consortium) profiles are used in many cases.

FIGS. 6A and 6B are look-up tables for converting between device-dependent CMYK space and device-independent L*a*b* space in accordance with standard ICC specifications. In FIG. 6A, the look-up table is used in a source profile to transform image data from CMYK to L*a*b* while the look-up table of FIG. 6B is used to transform image data from L*a*b* to CMYK in accordance with ICC specifications.

In general, input and output devices have standardized ICC profiles that are created by hardware device manufacturers to reflect device characteristics at the time of manufacture. However, since such device characteristics do change over time, ICC-profile-creating tools and calorimeters are provided to update or create new profiles to reflect current characteristics of the devices.

Color reproduction can be enhanced in a multifunction peripheral (MFP) having a printer used as an output device and a having a scanner used as an input device, by using the printer to output low to high density patches composed of primary colors (cyan, magenta, yellow), and then using the scanner to read the patches, and then performing primary color calibration. Although this technique enables desirable color matching for primary colors, it less effective for higher-order colors obtained by mixing a plurality of color materials.

Nevertheless, even in MFPs, and in particular, when the output device is an electrographic printer, high quality reproduction of color cannot be obtained due to rapid daily changes in device status (for example, the color and quality of output images rapidly change due to changes in device status compared with images output by the ink-jet printer), so that output images vary even if the same profile is used in the same device.

For the same reason, if a plurality of devices use the same profile to output the same data, each device outputs a different color image.

In addition, by using ICC-profile-creating tool and calorimeter, an ICC profile which matches a device status at that time can be created, so that an image can be output in desirable color. However, new profiles need to be created by first outputting numerous color patches and then measuring each and every color patch. This process is not only time-consuming, but it is also computation-intensive particularly for devices whose status often varies daily.

SUMMARY OF THE INVENTION

The present invention provides an image processing system and method. Among other advantages, the image processing system and method facilitates color conversion for a device whose status varies momentarily, and allows the device to output desirable color at any time.

According to an aspect of the present invention, an image processing system is provided which includes an output unit for allowing an output device to output patch-data items of plural multi-order colors represented by a first color space, a color measuring unit for measuring the color values, in an absolute color space, of the patch-data items output from the output device, a reference-value calculating unit for calculating reference values by converting the plural multi-order colors represented by the first color space based on a first color conversion table containing correspondence between the first color space and the absolute color space, a distance calculating unit for calculating distances between the color values measured by the color measuring unit and the reference values, which correspond thereto, and a correcting unit for correcting, based on the distances calculated by the distance calculating unit, a second color conversion table containing correspondence between the absolute color space and an output color space.

According to another aspect of the present invention, an image processing method is provided which includes an output step of allowing an output device to output patch-data items of plural multi-order colors represented by a first color space, a color measuring step of measuring the color values, in an absolute color space, of the patch-data items output from the output device, a reference-value calculating step of calculating reference values by converting the plural multi-order colors represented by the first color space based on a first color conversion table containing correspondence between the first color space and the absolute color space, a distance calculating step of calculating distances between the color values measured in the color measuring step and the reference values, which correspond thereto, and a correcting step of correcting, based on the distances calculated in the distance calculating step, a second color conversion table containing correspondence between the absolute color space and an output color space.

According to another aspect of the present invention, a program for executing the above method is provided.

According to another aspect of the present invention, a computer-readable storage medium storing the above program is provided.

Further aspects, features and advantages of the present invention will become apparent from the following description of the embodiments with reference to the attached drawings.

BRIEF DESCRIPTION OF THE DRAWINGS

FIG. 2 is a block diagram showing an example of the configuration of an image processing system according to a first embodiment of the present invention.

FIGS. 6A and 6b are illustrations of data representation forms of an ICC profile.

FIG. 11 is an illustration of lattice point data in an L*a*b* space.

FIG. 12 is an illustration of measured color values and reference values in lattice point data in the L*a*b* space.

FIG. 13 is an illustration of differences in L*a*b* space between items of lattice point data, and measured color values and reference values which correspond to the items.

DETAILED DESCRIPTION OF THE EMBODIMENTS

Figure 1:
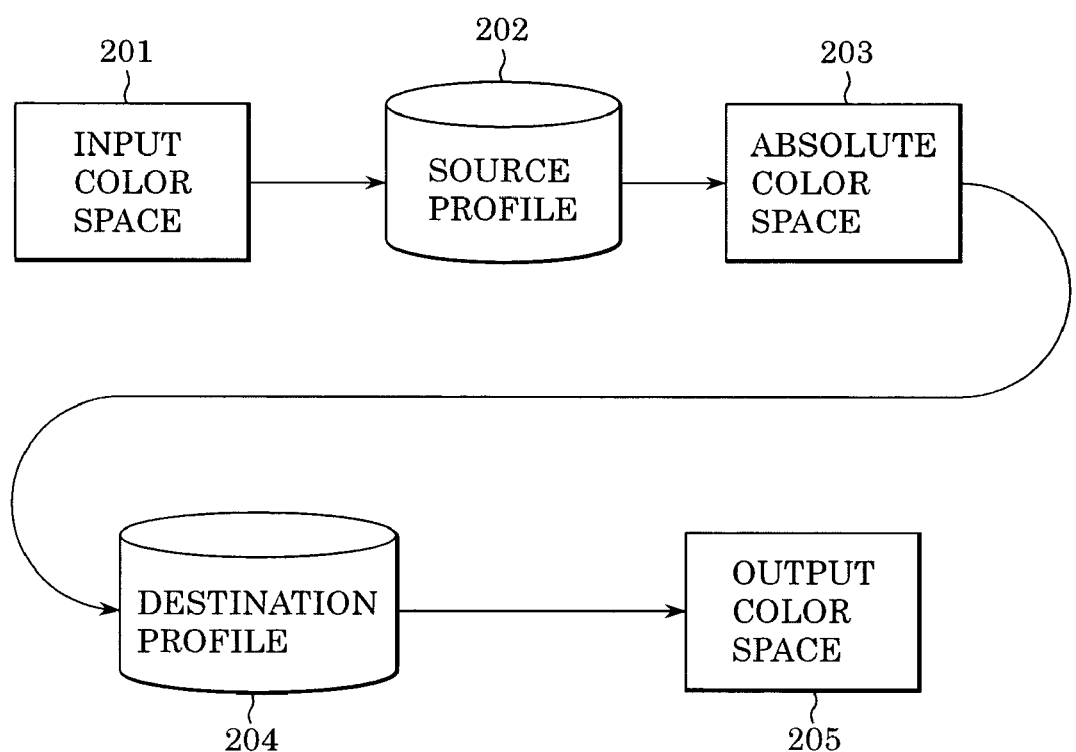
FIG. 1 is a block diagram showing color space changes in the case of outputting an image from an input device to an output device.

A detailed description of embodiments of the present invention is described below with reference to the accompanying drawings.

First Embodiment

FIG. 2 is a block diagram showing an example of the configuration of an image processing system in a first embodiment of the present invention. The image processing system connects offices 10 and 20 via a communication link such as the Internet 108. Among other components, office 10 includes MFPs 101 and 102, a management personal computer (PC) 104, a client PC 105, and a proxy server 106 all of which are coupled via a local area network (LAN) 109. The LAN 109 (Office 10) and a LAN 110 (Office 20) are connected to the Internet 108 via proxy servers 106 located in each office.

The MFPs 101 and 102 receive and output image information. Color patches output from the MFPs are measured by a calorimeter 103 connected to the management PC 104, which performs image processing, uses output color values from the color patches to update or create new profiles for the MFPs. The management PC 104 communicates the updated or created profiles to the MFPs. The clients PC 105 and 107 are provided for user operation.

Figure 3A:
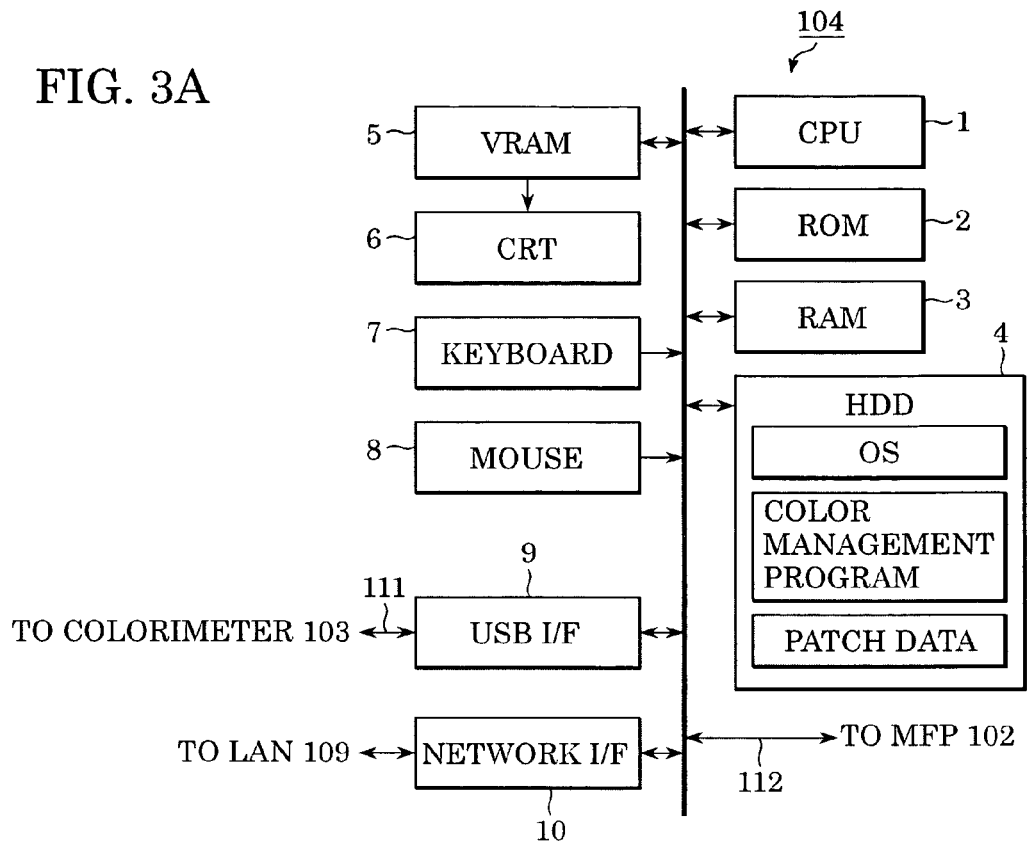
FIG. 3A is a block diagram showing a management PC in the first embodiment.

FIG. 3A is a block diagram showing the configuration of the management PC 104. As shown in FIG. 3A, the management PC 104 includes a central processing unit (CPU) 1 for controlling the PC, a read-only memory (ROM) 2 for storing a boot program, etc., and a random access memory (RAM) 3 for temporarily storing information while the PC is active.

The management PC 104 also includes a hard disk drive (HDD) 4, which is the permanent storage unit for programs and other information. The HDD 4 stores, for example, an operating system (OS), a color management program and color patch data. A video RAM (VRAM) 5 is a memory into which image data to be displayed is loaded. By loading the image data into the VRAM 5, the image can be displayed on a cathode-ray tube (CRT) 6. A keyboard 7 and a mouse 8 are used for various types of setting. A USB interface (I/F) 9 is used to establish connection to the colorimeter 103 through the USB 111. A network interface (I/F) 30 is used to establish connection to the LAN 109. The management PC 104 is connected to the MFP 102 through the direct-connection LAN 112.

Figure 3B:
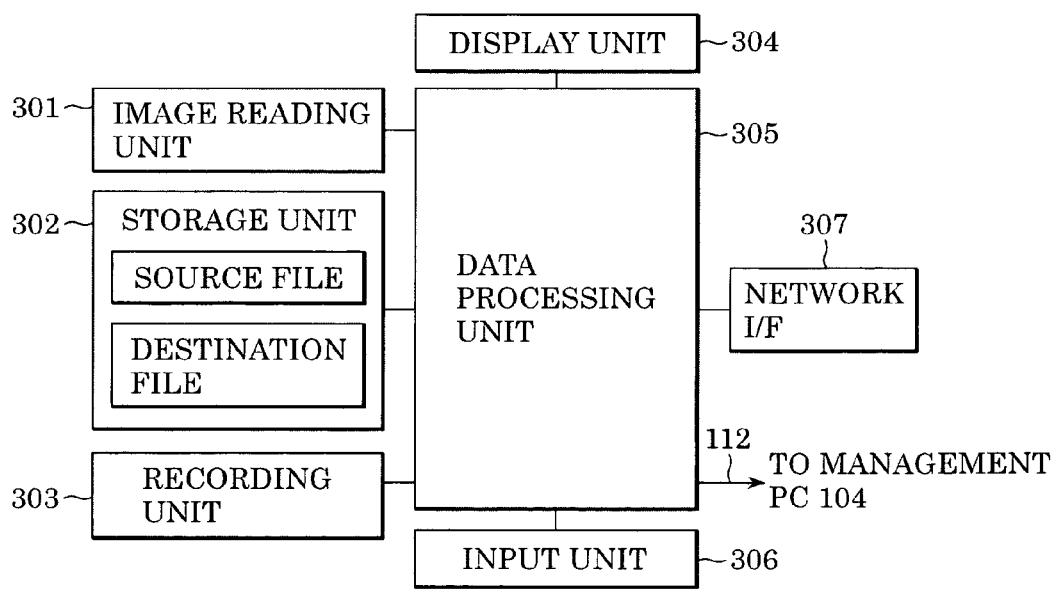
FIG. 3B is a block diagram showing an MFP in the first embodiment.

FIG. 3B is a block diagram showing the configuration of the MFP 102. In FIG. 3B, the MFP 102 includes an image reading unit 301 which includes an auto-document feeder (not shown). Although not shown, the image reading unit 301 uses a light source to illuminate one or more document images, uses a lens unit to focus each reflected document image on a solid-state image sensing device, and obtains a raster image-read signal having a density of 600 dpi from the solid-state image sensing device. For copying, the image signal is converted into a recording signal by a data processing unit 305, and, by outputting the recording signal to a recording unit 303, an image is formed on paper. Plural document images are copied by temporarily storing recording data for each page in a storage unit 302, and then sequentially outputting the recording data to the recording unit 303, each image is formed on paper.

An input unit 306 is a user input device such as the keyboard 7 and mouse 8 of FIG. 3A. The above consecutive operation is controlled by a control unit (not shown) in the data processing unit 305. In addition, the status of operation input and the image data are displayed on the display unit 304.

The storage unit 302 stores the recording data in units of pages and also stores source profiles and a destination profiles. The storage unit 302 is also controlled by the management PC 104. Exchange of data and control between each MFP and the management PC 104 are performed by using a network interface (I/F) 307 and the direct-connection LAN 112.

Printing data output from the client PC 105 is input from the LAN 109 to the data processing unit 305 through the network interface 307. The input printing data is converted into recordable raster data by the data processing unit 305, and a recording image based on the raster data is formed on paper by the recording unit 303.

Figure 4:
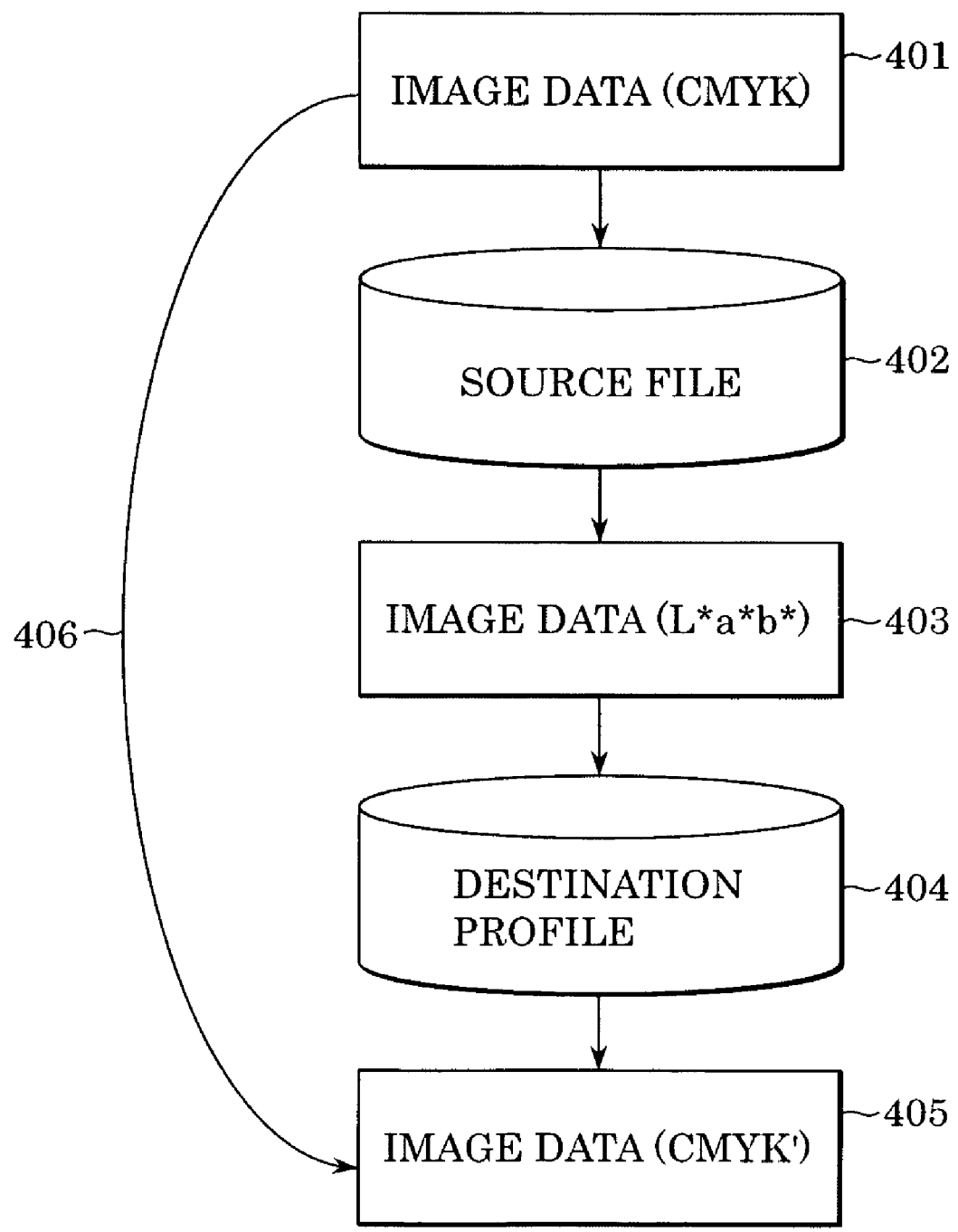
FIG. 4 is an illustration of a flow of data conversion in the case of outputting an image from the input device to the output device in the first embodiment.

When CMYK data is sent from the client PC 105 to the MFPs 101 and 102, the data processing unit 305 performs the process shown in FIG. 4. When the data processing unit 305 receives image data 401, the image data 401 is represented in CMYK form. The data processing unit 305 uses a source profile 402 to convert the received image data 401 into image data 403 represented in L*a*b*. Next, the data processing unit 305 uses a destination profile 404 to convert the image data 403 to image data 405 represented in CMYK'. Although the CMYK image data 401 and the CMYK' image data 405 are identical in dimension, their actual values differ since they are defined by different devices. As indicated by the arrow 406 shown in FIG. 4, the CMYK image data 401 can be directly output as the CMYK' image data 405 without using the source profile 402 and the destination profile 404. However, in such a case, device characteristics are not reflected, so that undesirable images are often output.

Outline of the Process Adjustment Process

Next, a profile adjustment process of the management PC 104 in the first embodiment is described below with reference to the flowchart shown in FIG. 5.

Figure 5:
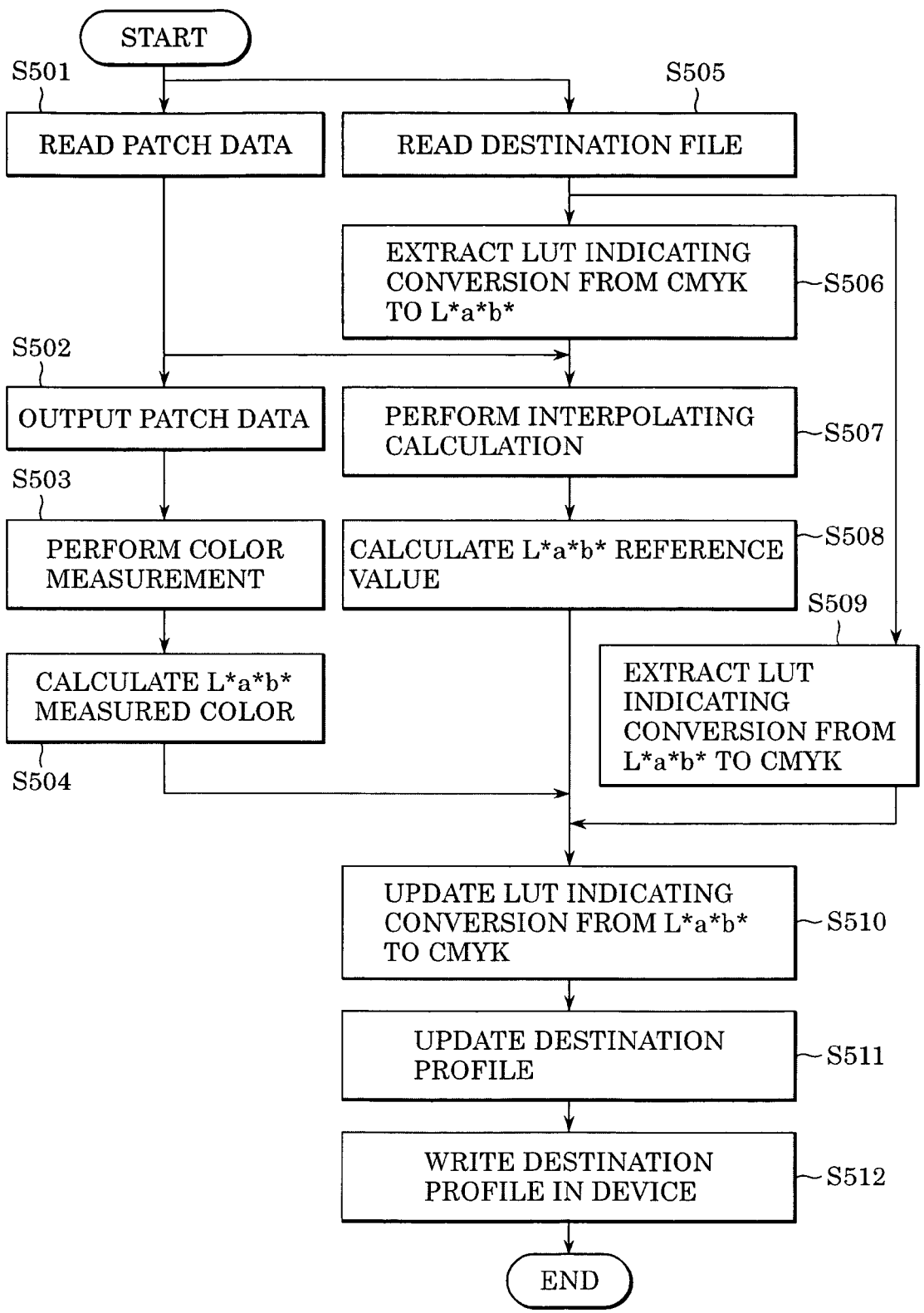
FIG. 5 is a flowchart showing a profile adjustment process of the management PC in the first embodiment.

As an exemplary method, the flowchart of FIG. 5 is implemented by a color management program installed on the HDD 4. Upon being loaded into the RAM 3, the color management program is executed by the CPU 1 of PC 104.

In step S501, CMYK patch data is read from the HDD 4. The patch data is composed of about one hundred higher-order colors and is made of CMYK numerical data and CMYK image data. In step S502, the MFP 101 outputs the patch data. Here, the CMYK patch data 401 is directly output as the CMYK' image data 405 without using the source profile 402 and destination profile 404 of FIG. 4. In step S503, the calorimeter 103 is used to perform color measurement on the output patch data. The result of measurement is sent to the management PC 104 through the USB 111, and an L*a*b* measured color value is calculated in the management PC 104 in step S504. The L*a*b* measured color value reflects the present reproduction state of the MFP 101.

Figure 7:
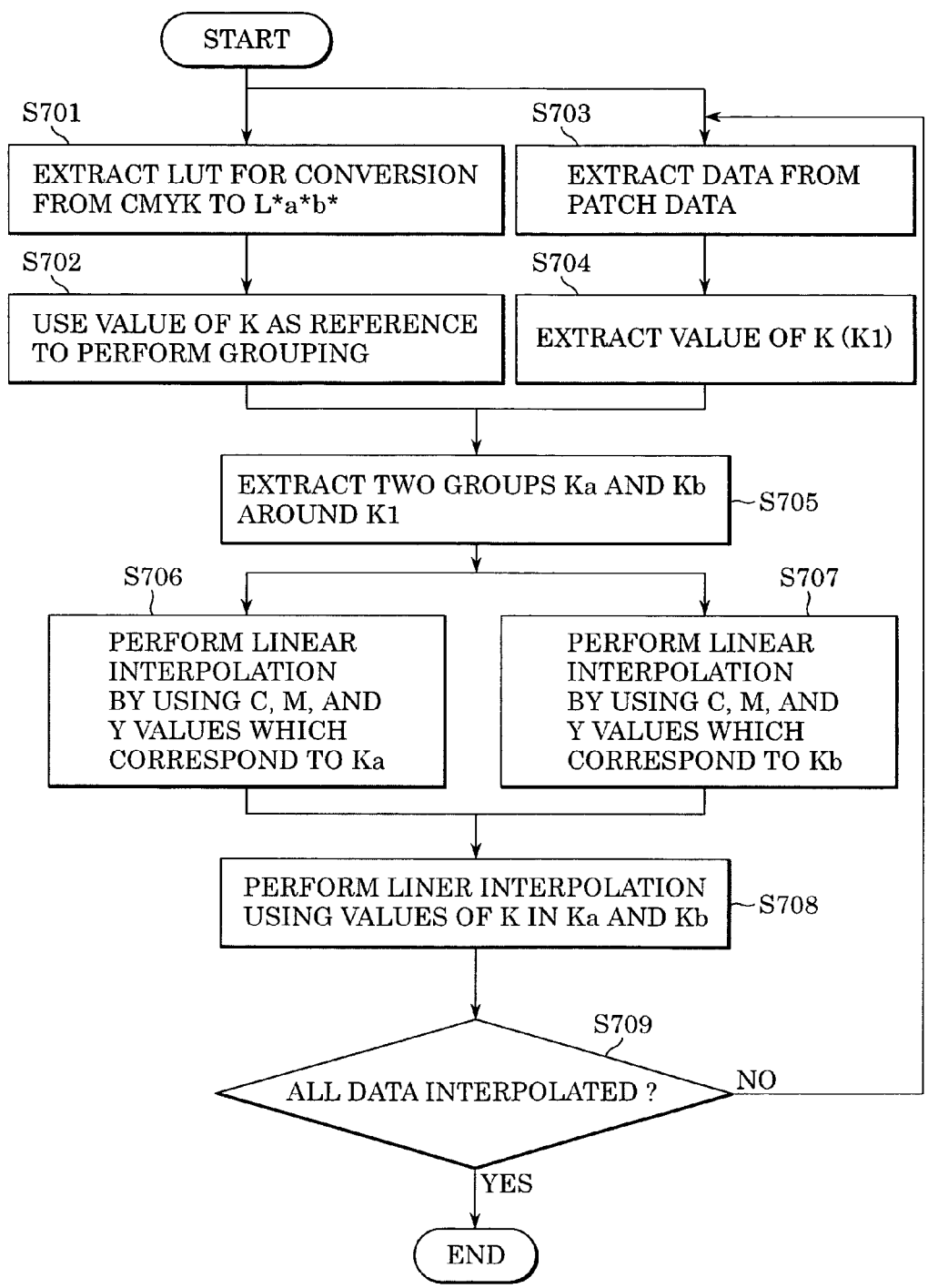
FIG. 7 is a flowchart showing an interpolation calculation process in the first embodiment.

In step S505, an ICC profile is read. For example, a destination profile stored on the MFP 101 is read. Alternatively, the destination profile may be stored and read from the management PC 104. In step S506, the process extracts a look-up table (included in the destination profile) for conversion from CMYK to L*a*b*. In step S507, an interpolation process further described with reference to FIG. 7 is performed. As a result, an L*a*b* reference value is calculated in step S508. In step S509, the process extracts, from the destination profile, a look-up table for conversion from L*a*b* to CMYK.

After that, in step S510, by using the L*a*b* measured color value, the L*a*b* reference value, and the look-up table for conversion from L*a*b* to CMYK, the look-up table for conversion from L*a*b* to CMYK is updated. Note that this updating process does not create a new look-up table, but values at determined positions in the original look-up table are modified. Accordingly, the number of items of patch data can be considerably reduced compared with when an entirely new profile is created. In this manner, the present embodiment is advantageous over conventional image processing systems since the time required for color measurement and the time required for calculation is considerably reduced.

In step S511, the updated look-up table is used to update the destination profile. In step S512, the updated destination profile is written into the MFP 101.

By applying the same process to the MFP 102, color differences caused by the difference in device status can be considerably suppressed. Therefore, cluster printing that allows a plurality of output devices to output the same data can be used. Also, this process is applicable to printing in which color varies rapidly with time, such as electro-photography. Although not necessary, it can be for the MFPs 101 and 102 to use a common destination profile. It can be also that the look-up table for conversion from CMYK to L*a*b* be identical.

Figure 9:
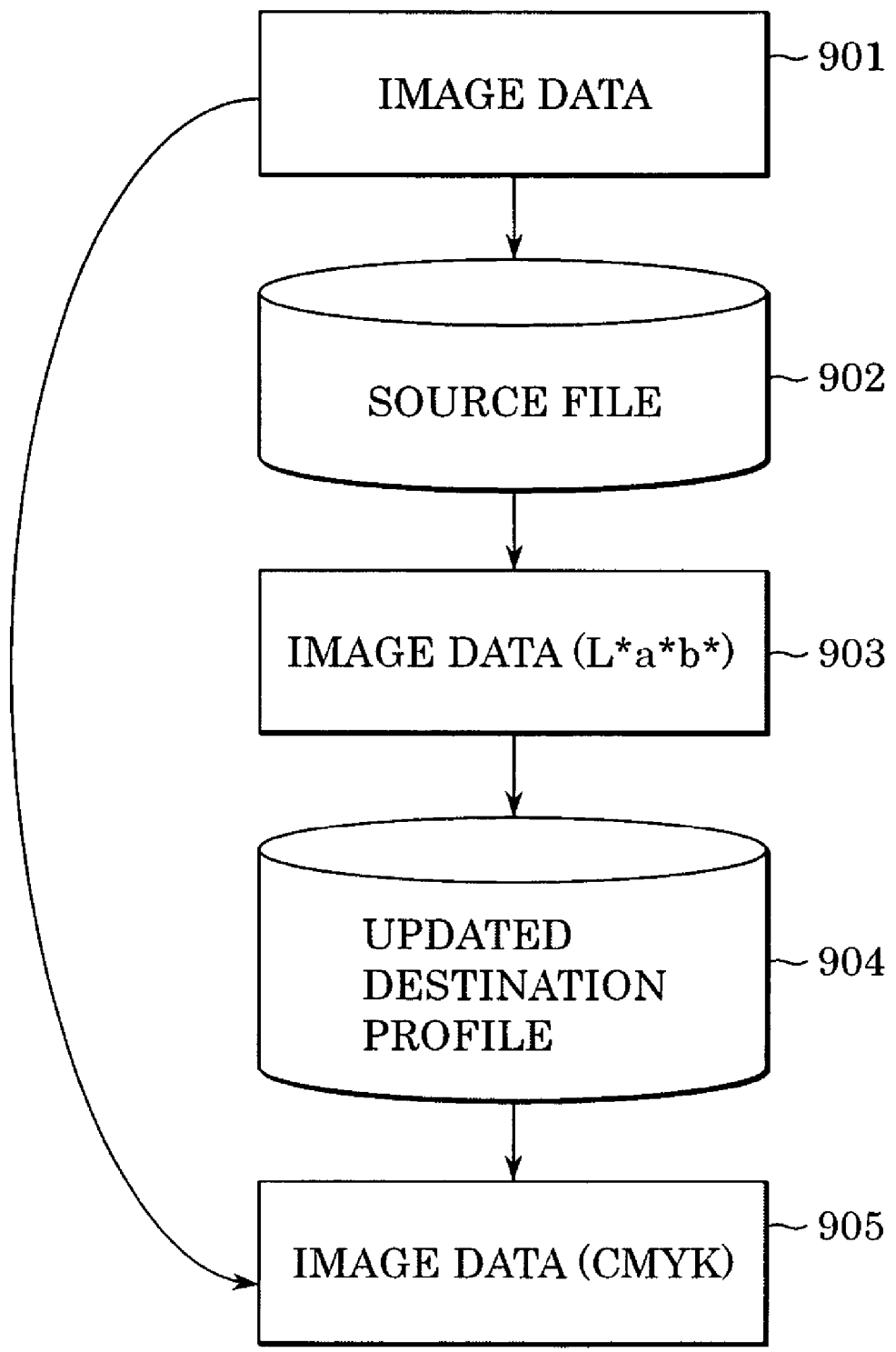
FIG. 9 is an illustration of a flow of data conversion using an updated destination profile.

When the destination profile updated by the above process is used to output an image from a printer, the image does not need to be a CMYK image. This is because, as FIG. 9 shows, in an actual printing flow, if there is a source profile 902 for converting image data 901 to L*a*b* image data 903, CMYK image data 905 can be created by using an updated destination profile 904. For example, when the source profile 902 is used to convert RGB data to L*a*b* data, the image data 901 may be RGB data. In addition, any source profile may be used if it is used to convert an input color space to an absolute color space (L*a*b*) handled by the updated destination profile.

The look-up table of the destination profile for conversion from L*a*b* to CMYK, and the look-up table for conversion from CMYK to L*a*b* may have any form if input values are in the absolute color space. However, it can be that both look-up tables use identically defined absolute color spaces. The actual processing uses a source profile having a look-up table for conversion to an absolute color space identical to the absolute color space handled by the destination profile.

The outline of the process of the management PC 104 in the first embodiment is as described above. In the above process, the interpolation process of step S507 and the look-up table update process of step S510 are described below.

Interpolation Calculation

In the interpolation calculation in step S507, an L*a*b* reference value for the patch data (CMYK) is calculated. The look-up table read before performing step S507 is used for conversion from CMYK to L*a*b*. The read look-up table contains L*a*b* values corresponding to combinations of CMYK values. By using this look-up table to perform interpolation calculation, an L*a*b* value for the patch data (CMYK) can be calculated. However, even if a CMYK color space has theoretically equal L*a*b* values, their actual values may differ if K values differ.

FIG. 7 is a flowchart showing an interpolation calculation process of the first embodiment.

In step S701, a look-up table for conversion from CMYK to L*a*b* is extracted. In step S702, grouping is performed with the value of K as a reference. In general, in many cases, in a look-up table for profile, input values gradually increase. In other words, the look-up table for conversion from CMYK to L*a*b* contains L*a*b* values for CMYK groups in which C, M, Y, and K values are changed by a predetermined amount. For example, assuming that each of C, M, Y, and K values has seventeen levels, when the values are grouped with the K value as a reference, seventeen groups are formed.

In step S703, patch data is extracted. This is an operation of extracting CMYK values in one patch. In step S704, among the extracted CMYK values, the K value is noted and referred to as K1.

Next, the grouped K values in the look-up table are noted. In step S705, two groups around K1 are extracted. For example, when a look-up table has 256 grayscales and 17 levels, and K1 is 20, a group in which K=16 and a group in which K=32 are extracted. One group having a lesser K value is referred to as Ka, and the other one having a greater K value is referred to as Kb. For each of the groups Ka and Kb, linear interpolation is performed by using CMY values. Here, conventional three-dimensional linear interpolation can be used (steps S706 and S707). After that, in step S708, for the result of linear interpolation for the groups Ka and Kb, one-dimensional linear interpolation is performed by using values in groups Ka and Kb. In other words, based on L*a*b* values for C, M, Y, and Ka, and L*, a*, and b* values for C, M, Y, and Kb, one-dimensional linear interpolation is performed.

As described above, an L*a*b* reference value for patch data is output. In addition, when it is determined in step S709 that the process has not been performed for all of the patch data, the process returns to step S703 and the above steps are repeated. When it is determined in step S709 that the process has been performed for all of the patch data, the process ends.

According to the above-described interpolation calculation process, by using a look-up table in a destination profile for conversion from CMYK to L*a*b*, and performing special processing on a K value, an L*a*b* reference value for patch data can be found. This result is utilized in step S510 (shown in FIG. 5) for updating the look-up table for conversion from L*a*b* to CMYK.

Updating of Look-up Table for Conversion from L*a*b* to CMYK

The destination profile is used to convert data in an absolute color space to the color space of an output device when actual printing is performed. Thus, the reason that device instability causes different output results is that the look-up table for conversion from L*a*b* to CMYK in the destination profile is inappropriate. Therefor, step S510 for updating the look-up table for conversion from L*a*b* to CMYK is useful in the first embodiment.

Figure 8:
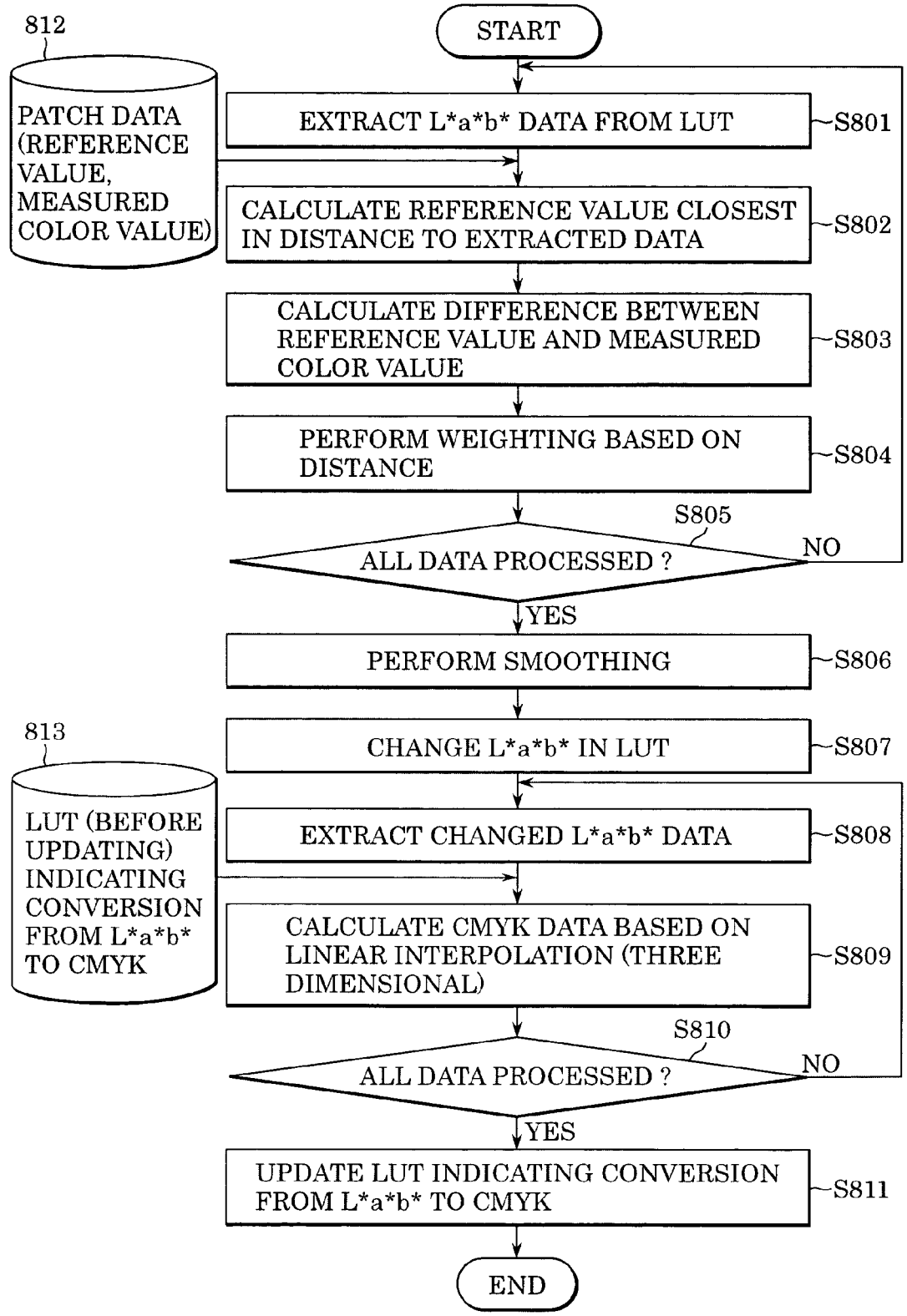
FIG. 8 is a flowchart showing a process for updating a look-up table for conversion from L*a*b* to CMYK in the first embodiment.

A specific process for updating the look-up table for conversion from L*a*b* to CMYK is described below with reference to the flowchart shown in FIG. 8.

In step S801, L*a*b* data is extracted from the look-up table for conversion from L*a*b* to CMYK. L*a*b* data is considered lattice point data in which a* and b* are incremented by a predetermined value. FIG. 11 is an illustration of the presence of lattice point data in an L*a*b* space. For brevity of illustration, FIG. 11 shows an example of 3 by 3 by 3 lattice-point data. By way of example, in the case of a look-up table in which each of L*, a*, and b* has 33 levels, in step S801, from 33 by 33 by 33 lattice points, one lattice point is extracted.

In step S802, all measured color values and reference value of each patch data 812 are extracted, and reference and measured color values which are closest to each of the L*, a*, and b* values extracted in step S801 are calculated. FIG. 12 shows an example of calculation. Reference and measured color values exist in a lattice point space, as shown in FIG. 12, since the values are L*, a*, and b* data. For brevity of illustration, reference values 1 and 2 are exemplified. Although the example shown in FIG. 12 has reference values 1 and 2, reference value 1 is selected as a search result because reference value 1 is the closest to lattice point data of interest.

The process proceeds to step S803, and calculates the difference (distance) between each reference value of L*, a*, and b* calculated in step S802, and a measured color value corresponding to the reference value. The calculated values are used to correct the L*, a*, and b* data. However, when the number of patch data is small, it is often the case that a reference value, which has a large distance from lattice point data, is extracted. Since it may be that the reference value is not greatly affected as described above, in the first embodiment, the distance between each reference value and each extracted item of L*, a*, and b* data is calculated, and, in step S804, weighting is performed based on the calculated distance. For example, a Euclidean distance in a three-dimensional space is used as the distance, and the weight is represented by $$W = 1/(dist^5 + 1)$$

where W represents a weight, and dist represents a value obtained by normalizing a distance from a reference value of each of L*, a*, and b* by using distances for three lattice points. Note that the above is not limited to the use of three lattice points as described above, it may be applicable to four lattice points distance, or five lattice points distance, etc.

In step S805, it is determined whether the above processing is repeated for all the L*, a*, and b* values in the look-up table.

In the processing through step S805, the differences between reference values and measured color values for all the L*, a*, and b* values are calculated. FIG. 13 is a schematic illustration of the calculated differences between reference values and measured color values for all the lattice points. In FIG. 13, each arrow indicates a direction vector from a measured color value. Although the look-up table can be updated by shifting the L*, a*, and b* values at lattice points by the direction vectors, due to a difference in affected reference value, there may be a direction vector having an extreme direction and magnitude. In the example shown in FIG. 13, the direction vector V encircled with the circle has an extreme magnitude compared with other direction vectors around the direction vector V. When this vector V exists, updated amounts of L*, a*, and b* values at lattice points which correspond to the vector V are extremely greater than updated amounts of L*, a*, and b* values at surrounding lattice points, thus causing a pseudo-outline. Accordingly, by smoothing the differences (step S806), the L*, a*, and b* values are prevented from being updated to extreme values. Methods for smoothing include a method of totaling values at 5 by 5 by 5 lattice points around a lattice point of interest, and calculating the average of the values, and a method of multiplying a value at a lattice point of interest before calculating an average.

In step S807, lattice point data is changed by adding, to L*a*b* lattice point data, the smoothed differences between reference values and measured color values.

In step S808, one item of the changed L*a*b* data is extracted. By finding CMYK values for the changed L*a*b* data, the look-up table in the destination profile for conversion from L*a*b* to CMYK can be updated. Accordingly, by using a feature in which an un-updated look-up table 813 for conversion from L*a*b* to CMYK describes conversion from L*a*b* to CMYK, CMYK values corresponding to the updated L*, a*, and b* values are found by performing three-dimensional linear interpolation calculation by using CMYK values at lattice points adjacent to the updated L*, a*, and b* values (step S809). One example is the look-up table shown in FIG. 6B. As shown in FIG. 6B, input values are L*, a*, and b* values. Thus, compared with the case of inputting CMYK values, special processing does not need to be performed, and conventional three-dimensional linear interpolation may be used. The above processing is performed for all the updated L*a*b* data (step S810).

As described above, new L*, a*, and b* values and corresponding CMYK values are obtained. Accordingly, by using the obtained values, the look-up table for conversion from L*a*b* to CMYK is updated (step S811).

Number of Patches

Although the exemplary number of color patches is 100 (one hundred), it is not limited to this number. It can be also that the colors be mutually at an appropriate distance from one another. In this case, the more the number of patches, the longer the time required for color measurement. Thus, overall processing speed decreases, but processing accuracy increases instead. The fewer the number of patches, the lower the accuracy. However, the overall processing speed is increased. If the number of patches is too large or too small, an appropriate effect cannot be obtained. However, compared with the technique of the related art for creating a new profile, in the first embodiment, only necessary part of data in the original profile is corrected. Thus, a considerably small number of patches enables processing.

Figure 10:
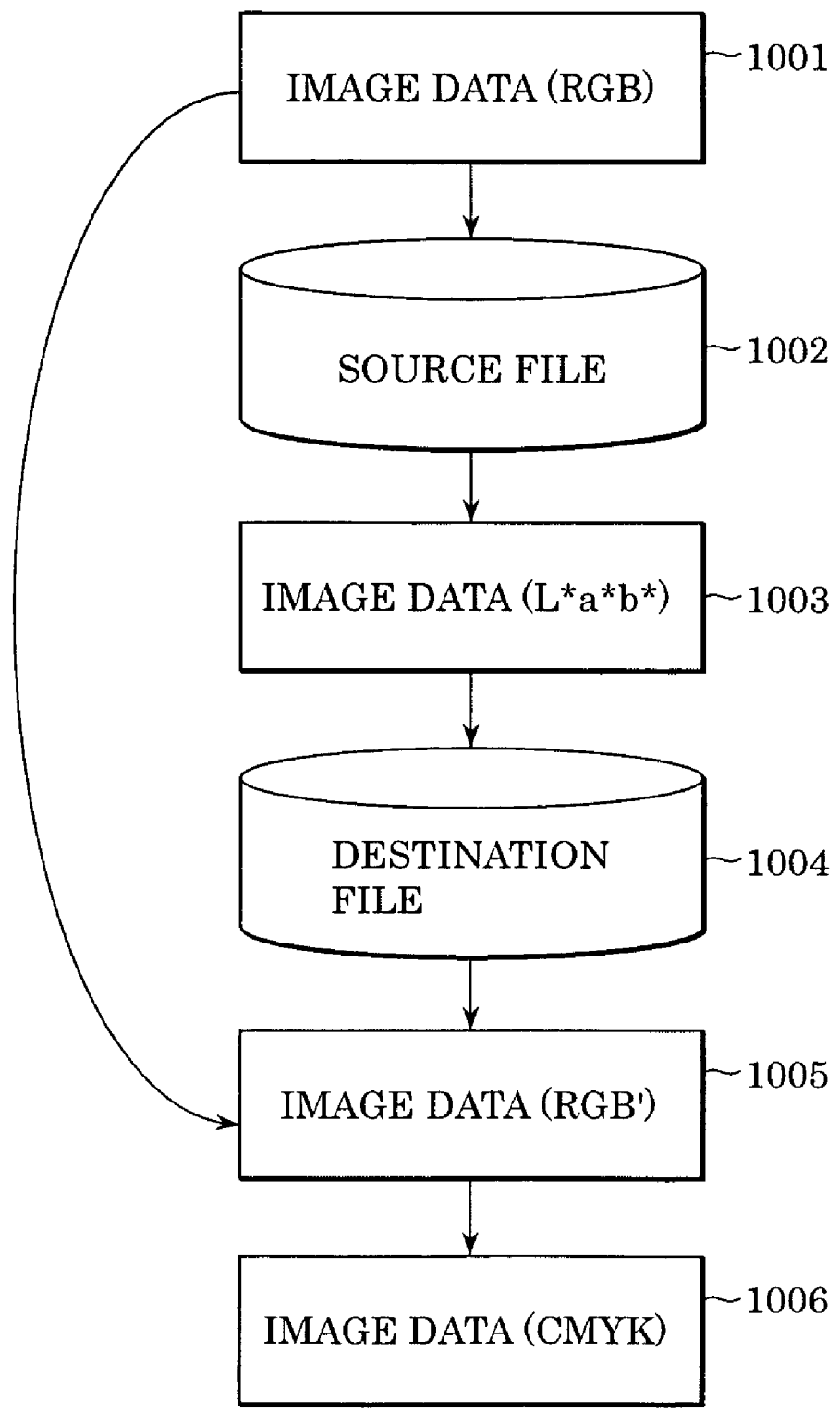
FIG. 10 is an illustration of a data flow in a case in which a destination profile includes a look-up table for conversion from L*a*b* to RGB.

First Embodiment as Modified for when CMYK is not Directly Handled in Destination Profile The first embodiment describes the case of using the destination profile having a look-up table for conversion from L*a*b* to CMYK. However, some printers do not have any destination profiles for direct conversion from L*a*b* to CMYK. FIG. 10 is a flowchart showing a data flow in a case in which a look-up table of a destination profile for conversion from an absolute color space to an output color space represents conversion from L*a*b* to RGB. In FIG. 10, a source profile 1002 is used to convert RGB image data 1001 to L*a*b* image data 1003. A destination profile 1004 is used to convert the L*a*b* image data 1003 to RGB' image data 1005. The RGB' image data 1005 is device-dependent RGB data. For an RGB printer, the RGB' image data 1005 is output in unchanged form. For a CMYK printer, the RGB' image data 1005 is converted to CMYK image data 1006 before being output.

Here, similarly to the case of CMYK data, the RGB image data 1001 can be directly used as the RGB' image data 1005. For an RGB printer, the RGB image data 1001 is directly output without using profiles 1003 and 1004. By performing color measurement on the output image, a measured color value is obtained. In addition, by using patch data and a look-up table for conversion from RGB to L*a*b*, which is included in the destination profile, an L*a*b* reference value is calculated. In the CMYK case, special interpolation must be used since the K value is special. In the above case, no value corresponds to the K value. Thus, three-dimensional linear interpolation is performed, with the image data unchanged.

By using the measured color value, the L*, a*, and b* reference values, and the look-up table of the destination profile for L*a*b* to RGB can be updated.

For a CMYK printer, accuracy changes when the RGB' image data 1005 is converted to the CMYK image data 1006. However, similarly, a measured color value can be acquired and used.

As described above, regardless of the color space type, this embodiment is applicable to a case in which the destination profile includes a look-up table for conversion from an input color space to an absolute color space and a look-up table for conversion from an absolute color space to an output color space, and in which input and output color spaces handled by both look-up tables are of the same type.

Alternate Process for Updating Look-up Table for Conversion from L*a*b* to CMYK

Another process for updating look-up table for conversion from L*a*b* to CMYK is described below.

Figure 14:
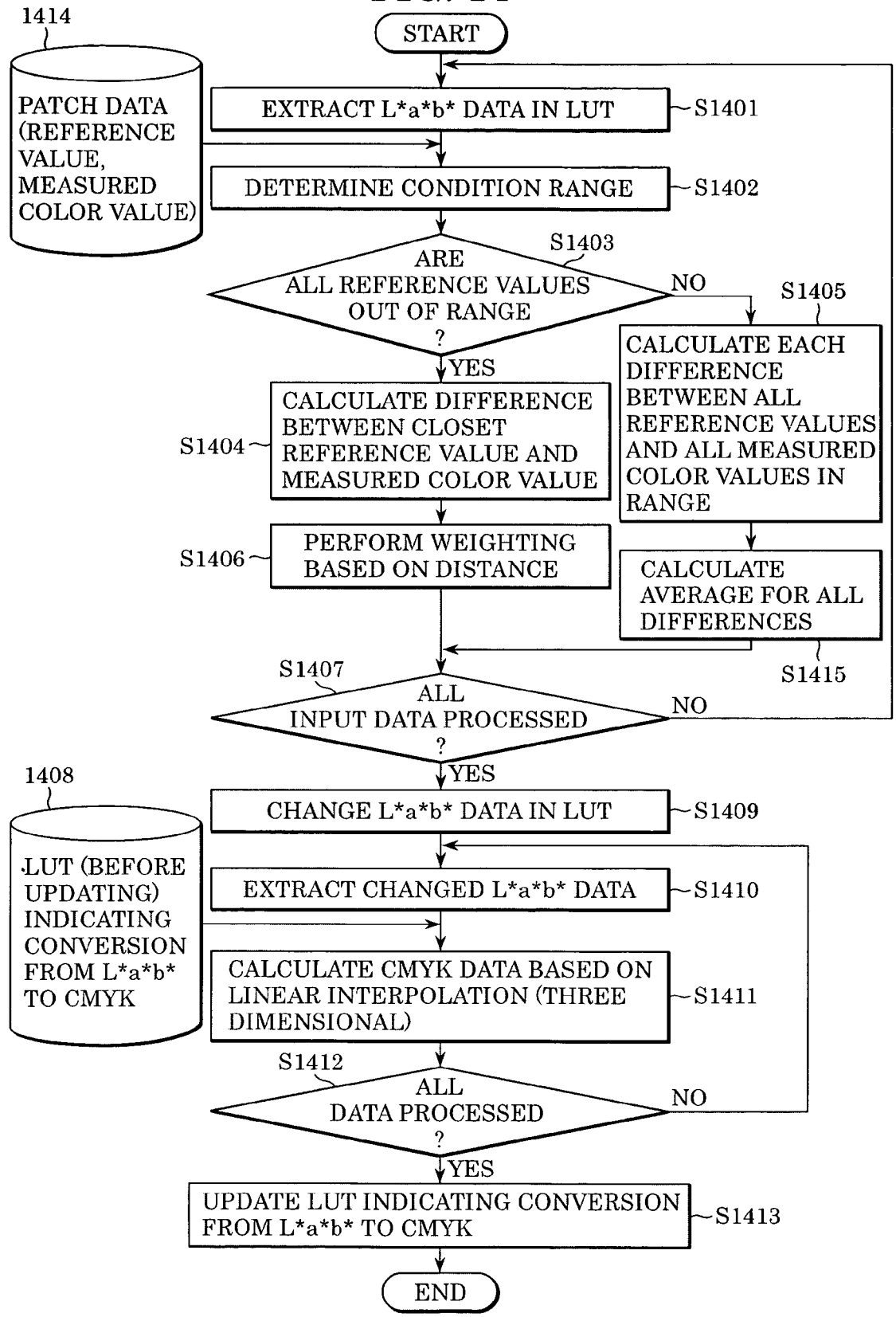
FIG. 14 is a flowchart showing another process for updating a look-up table for conversion from L*a*b* to CMYK.

FIG. 14 is a flowchart showing another exemplary process for updating a look-up table for conversion from L*a*b* to CMYK in accordance with an embodiment of the present invention.

Figure 15A:
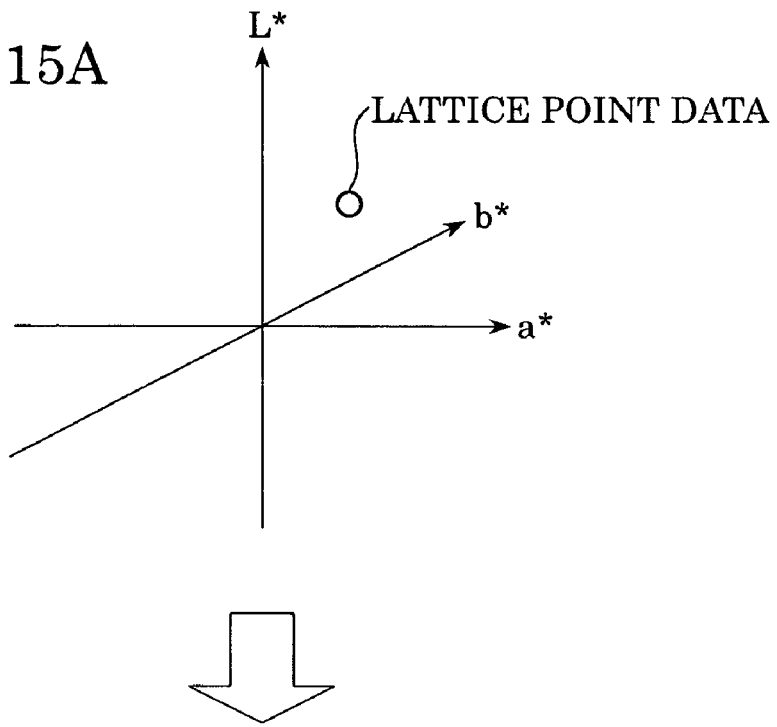
FIGS. 15A and 15B are graphs showing a condition range in another process for updating a look-up table for conversion from L*a*b* to CMYK.
Figure 15B:
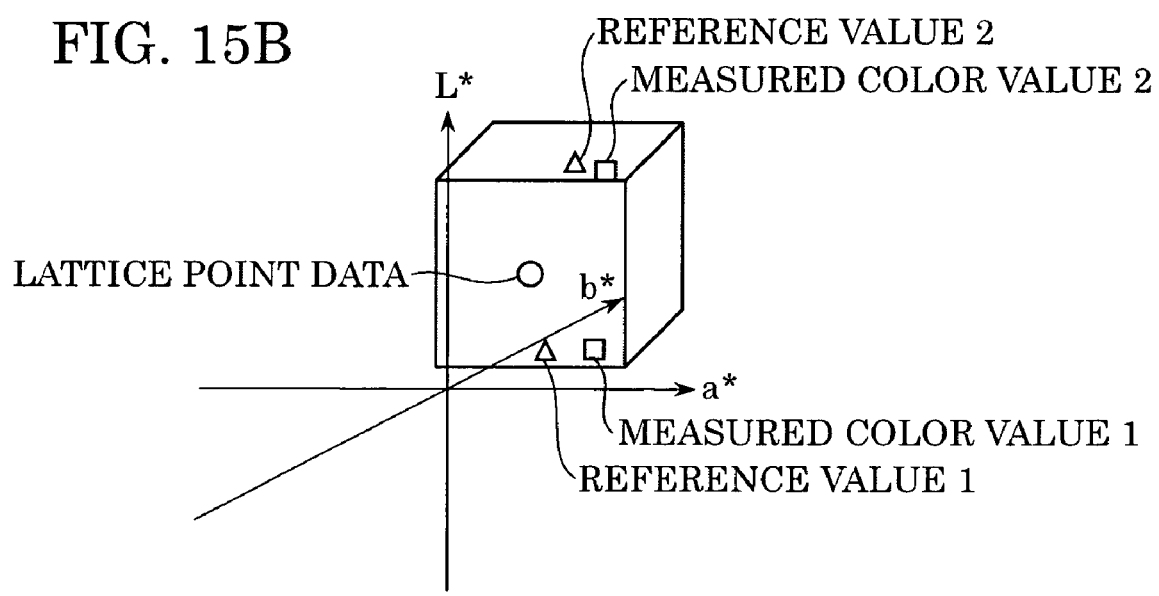

In step S1401, L*a*b* data is extracted from the look-up table. Next, each L*a*b* reference value previously calculated and each measured color value 1414 obtained by color measurement are read and a condition range is determined in step S1402. The condition range is a predetermined range around an extracted lattice point in the look-up table. In step S1403, it is determined whether the reference value is within the condition range. When the reference value is included in the condition range, all differences between the L*a*b* reference values and the measured color values, which correspond thereto, are found (step S1405), and the average of the differences is calculated (step S1415). This example is shown in FIG. 15. The lattice point data (in the L*a*b* space) shown in FIG. 15A is the L*a*b* data extracted in step S1401. FIG. 15B shows the condition range set in step S1402. In the example shown in FIG. 15B, the condition range is set in size of 5 by 5 by 5 lattice points. In the example shown in FIG. 15B, two reference values, reference values 1 and 2, are included in the condition range. Thus, differences between lattice point data and each measured color value are calculated and the average of the differences is calculated. By performing this manner, an effect similar to that of smoothing in the above embodiment can be obtained, thus preventing a pseudo-outline from being generated.

If it is determined in step S1403 that the L*a*b* reference value is not included in the condition range, an L*a*b* reference value, which is the closest in distance, is calculated in step S1404, and a difference between the L*a*b* reference value and a corresponding measured color value is weighted in accordance with the distance in step S1406. By way of example, similarly to the above case, a Euclidean distance in three-dimensional space is used as the distance. The weight is represented by $$W=1/(dist^5+1)$$

where W represents a weight, and dist represents a value obtained by normalizing a distance from a reference value of each of L*, a*, and b* by using distances for three lattice points. It is not limited to the three lattice points, and it can be four lattice points or five lattice points.

When the L*a*b* reference value is out of the condition range, it is often the case that the value of the weight may be uniform (e.g., a quarter).

After all the above operations are performed, the calculated value is used to change all the L*a*b* data (step S1409). In step S1410, one item of the changed L*a*b* data is extracted. By using a look-up table 1408 for conversion from L*a*b* to CMYK, in step S1411, CMYK data is calculated based on (three-dimensional) linear interpolation. In step S1412, it is determined whether all the data have been processed. If so, in step S1413, the look-up table for conversion from L*a*b* to CMYK is updated.

In this manner, similarly to the above-described example, the look-up table for conversion from L*a*b* to CMYK can be updated.

According to the first embodiment described above, by using reference values calculated by using a look-up table for converting data defined in an input color space included in a profile to data defined in an absolute color space, measured color values obtained by performing color measurement on patch data, and a look-up table for converting data defined in an absolute color space to data in an output color space, a profile for converting data defined in the absolute color space to data in the output color space can be updated. Thus, optimal color matching can be performed for a device whose output can be easily influenced by a state at an output time. Profile updating in this case can be simply performed by changing a part of the original profile without creating a new profile. Accordingly, compared with the known technique of re-creating all profiles, the number of patches can be reduced, and, in addition, simplified processing can considerably reduce the processing time required for profile updating.

By applying the above-described profile updating process to a plurality of devices, in each of all the devices, optimal color matching is performed, thus substantially reducing a color difference, for each device in the case of using plural devices.

Second Embodiment

As described above, by using a tool for re-creating an ICC profile from the beginning, and a calorimeter, an ICC profile that matches a device status at the required time is created. Thus, an image can be output in a desirable color. However, when many color patches are output and each color patch needs to be measured, this process can become time consuming. Accordingly, it is difficult to apply this technique to a device whose status varies daily, such as an electro-photographic device. In particular, when the user wishes to output a limited image, creation of new profiles is not efficient.

Accordingly, in the second embodiment, by analyzing color distribution of an image designated by the user, extracting only colors which are mainly used in the image, patches, whose number is less and which are optimal, can be output. In the second embodiment, profiles can be updated by using fewer patches to reduce processing time.

The configurations of an image processing system, a management PC, and MFPs in the second embodiment are identical to those shown in FIGS. 2, 3A, and 3B. Accordingly, the second embodiment is described with reference to FIGS. 2, 3A, and 3B.

Figure 16:
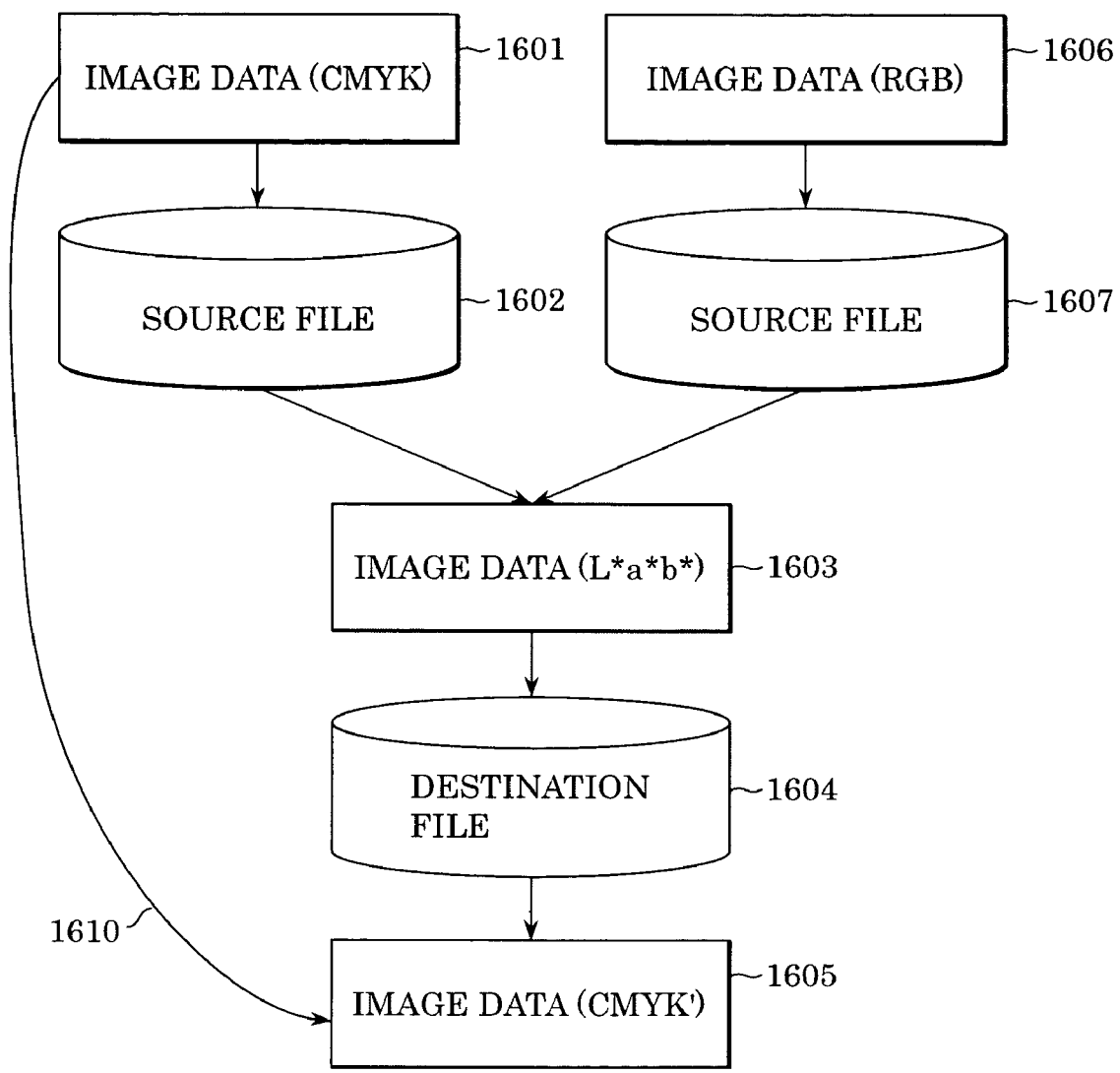
FIG. 16 is a block diagram showing a data conversion flow in the case of outputting an image from an input device to an output device in a second embodiment of the present invention.

In the second embodiment, when CMYK data is sent from the client PC 105 to the MFPs 101 and 102, the data processing unit 305 performs the processing shown in FIG. 16. When the data processing unit 305 receives image data 1601, the image data 1601 is represented in CMYK. By using a source profile 1602, the CMYK data 1601 is converted to image data 1603 which is represented in an absolute color space such as L*a*b*. Next, by using a destination profile 1604, the image data 1603 is converted to CMYK' image data 1605. Although the CMYK image data 1601 and the CMYK' image data 1605 are identical in data dimensions, their actual values differ since they are defined by different devices. In addition, regarding exception handling, as indicated by the arrow 1610 shown in FIG. 16, the CMYK image data 1601 can be directly output as the CMYK' image data 1605 without using a source profile 1602 and a destination profile 1604. Since device characteristics are not reflected in this case, it is often the case that an undesirable image is output.

The above color conversion function is also realized by the management PC 104 and the client PCs 105 and 107. Even if RGB image data 1606 is input, the RGB image data 1606 is converted to L*a*b* imaged data by using a source profile 1607. After that, similar processing is performed. However, the color space of an output device is CMYK. Thus, the RGB image data 1606 cannot be directly output as indicated by the arrow 1610.

Processing Outline

A profile adjusting process of the management PC 104 in the second embodiment is described below with reference to the flowchart shown in FIG. 17.

Figure 17:
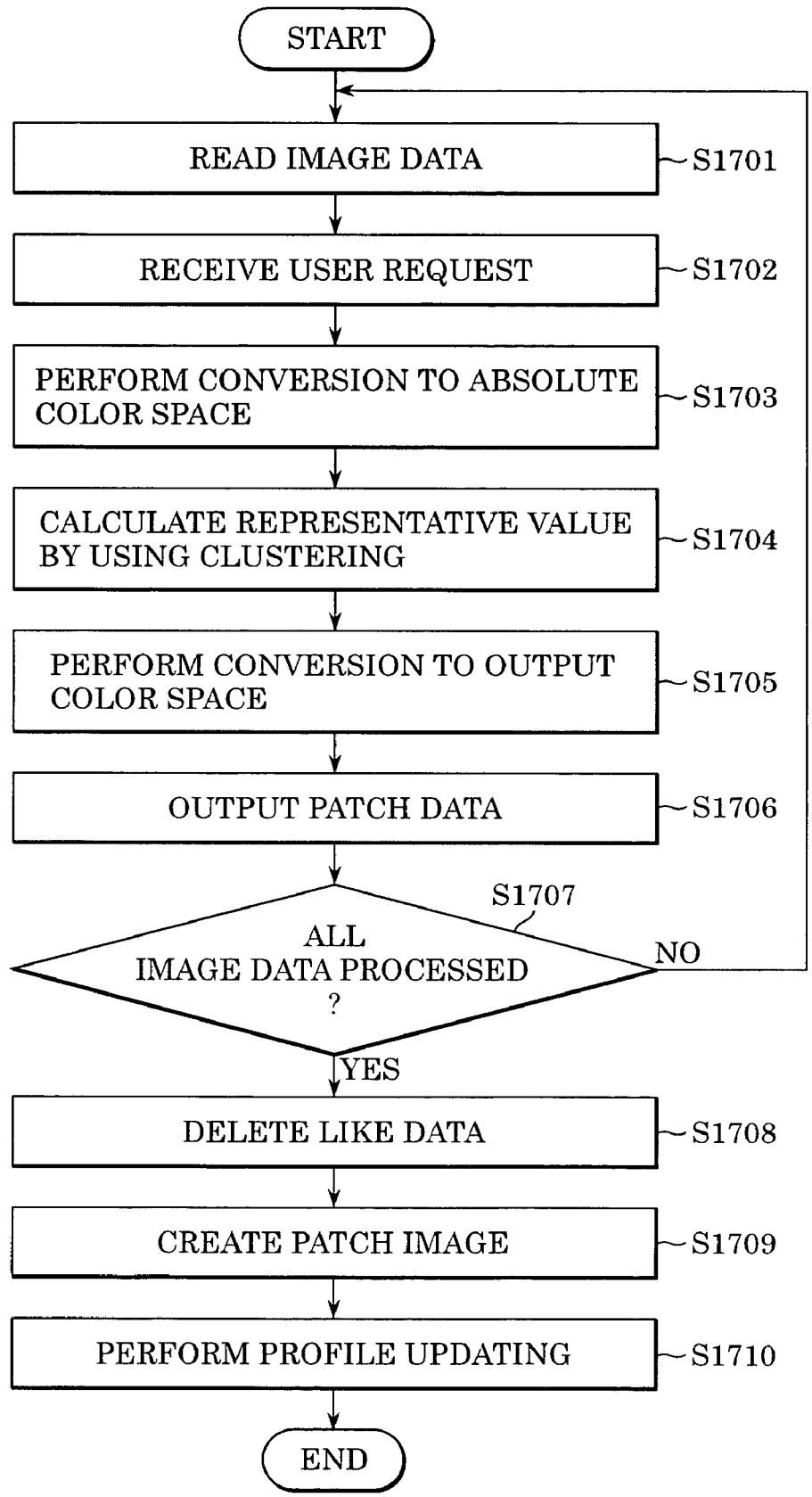
FIG. 17 is a flowchart showing an outline of a profile adjusting process of a management PC in the second embodiment.

A program which corresponds to the flowchart in FIG. 17 is included in a color management program installed into the HDD 4 in the management PC 104. This program is loaded into the RAM 3 and is executed by the CPU 1.

In step S1701, image data which is output from the client PC 105 in response to a user's instruction is read. In step S1702, a user request is received, which determines the number of output patches. When the user wishes highly accurate color correction, the number of patches increases. When speed for correction is emphasized, the number of patches decreases.

Proceeding to step S1703, the process converts data of all pixels forming the image data read in step S1701 to data in a device-independent absolute color space (e.g., L*a*b*). In general, image data output from a device is defined in a device-dependent color space such as RGB and CMYK. These color spaces are not such uniform color spaces that a distance in the color space is proportional to a color difference felt by a human. Thus, these color spaces are not appropriate in clustering, which is performed thereafter. Conversely, in an absolute color space typified as L*a*b*, a distance in the color space is proportional to a color difference felt by a human. Thus, it may be said that the absolute color space is appropriate for the clustering, which is performed thereafter. Thus, processing in step 1703 is essential. Although, in the second embodiment, L*a*b* is used, any color space may be used if it is independent from a device.

In step S1704, by using clustering, representative values, whose number is the number of patches, which satisfy a user request are calculated. In this calculation, L*a*b* data items, whose number satisfies the user request, are output. In step S1705, the data items are converted to have an output color space form. In step S1706, the converted data items are then output.

In step S1707, it is determined whether processing has been performed for all image data, which is requested for printing by the user. If yes, the process proceeds to step S1708. If not, the process returns to step S1701 and repeats the processing.

In step S1708, like data is deleted. When processing is performed for plural images, like-color data may be output. Since such data increases processing time, it is preferable to delete such data.

In step S1709, creation of a patch image is performed. The second embodiment relates to a printer for outputting an image in CMYK. Accordingly, CMYK patches are created. For a printer for outputting an image in color other than CMYK, patches which match an output color space of the printer need to be created.

Finally, in step S1710, profile updating is performed. Here, the patch data created in the above processing is used. This makes it possible to correct only each required portion in the profile. This step S1710 corresponds to the process in accordance with the flowchart (shown in FIG. 5) described in the first embodiment. Therefore, regarding specific processing of step S1710, reference is made to the description of the first embodiment.

The outline of the process of the management PC 104 in the second embodiment is as described above. Each of steps S1702 to S1705 is specifically described below.

Step S1702: Regarding User Request

Reception of the user request in step S1702 is described.

Figure 18:
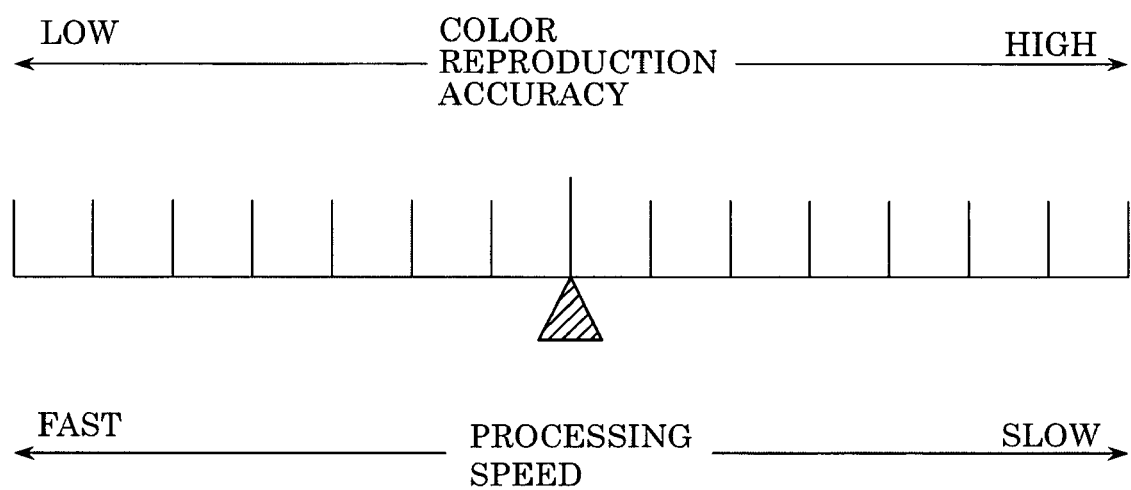
FIG. 18 is an illustration of a user interface screen for designating color reproduction accuracy and processing speed.

In step S1702, the user request is received. As described above, this user request includes information about whether the user emphasizes color reproduction accuracy, or information about whether the time required for color correction is to be shortened. When considering look-up-table rewriting, in general, as the number of patches is greater, the color reproduction accuracy is higher, but the processing time is longer. Conversely, as the number of patches is smaller, the processing time only needs to be shorter, but the color reproduction accuracy deteriorates. Accordingly, by utilizing the above trade-off relationship to display the user interface screen shown in FIG. 18, the user can consider the request. As shown in FIG. 18, the trade-off relationship between the color reproduction accuracy and the processing speed is displayed in a slide-bar form. The user can designate the color reproduction accuracy and the processing speed by, for example, using a mouse to slide a triangular pointer. By way of example, in the case of emphasizing the color reproduction accuracy even if the processing speed is slow, the pointer is moved to the right. In the case of increasing the processing speed even if the color reproduction accuracy is low, the pointer is moved to the left. Positional information of the pointer position is used as the user request in the clustering in step S1704.

Step S1703: Conversion to Absolute Color Space

In step S1703, image data in the device-dependent color space is converted to image data in the device-independent color space. Any technique may be used for the conversion. In the second embodiment, interpolation using a look-up table is described below.

The ICC profile includes a look-up table for converting a device-dependent color space to a device-independent color space (absolute color space), and a look-up table for converting a device-independent color space to a device-dependent color space. Accordingly, by using the look-up tables to perform interpolation, color conversion is performed. Here, in particular, a look-up table (for conversion from a device-dependent color space to a device-independent color space) which is used as a source profile is used. This is because the use of a look-up table used in an actual printing process enables output of optimal patches.

When the color space of image data is RGB, conventional interpolation is performed. However, in the case of CMYK, even if input data and output data are represented in L*a*b* values, the actual color may considerably differ depending on the K value. Thus, interpolation based on this difference is performed.

Figure 19:
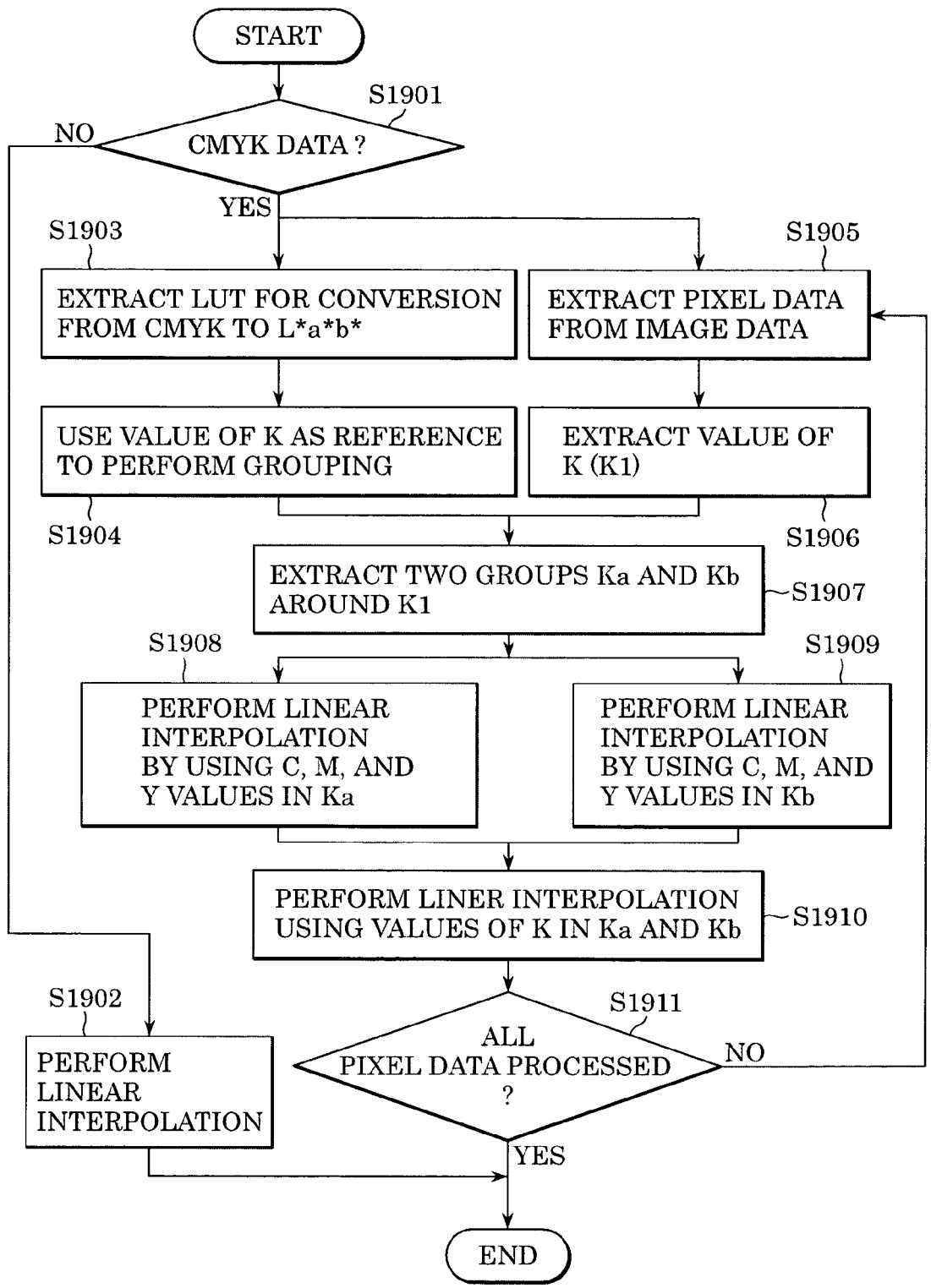
FIG. 19 is a flowchart showing an interpolation calculation process in the second embodiment.

FIG. 19 is a flowchart showing an interpolation process of the second embodiment.

In step S1901, it is determined whether the received image data is CMYK image data. If not, the process proceeds to step S1902 and performs conventional linear interpolation. By way of example, if the image data is RGB data, a look-up table for conversion from RGB to L*a*b* is extracted. Three-dimensional linear interpolation is performed, and the process ends. If the read data is CMYK data, the process proceeds to step S1903, and a look-up table for conversion from CMYK to L*a*b* is extracted.

In step S1904, grouping is performed with the K value as a reference value. In general, in the look-up table of the profile, it is often the case that input values gradually increase. In other words, the look-up table (for conversion from CMYK to L*a*b*) stores L*, a*, and b* values for a CMYK group obtained by changing C, M, Y, and K values by each predetermined amount. For example, assuming that each of C, M, Y, and K values has seventeen levels, when the values are grouped with the K value as a reference, seventeen groups are formed.

In step S1905, pixel data is extracted from the image data. All the pixel data must be converted to L*a*b*. In step S1906, among the extracted C, M, Y, and K values, the K values is noted and referred to as K1.

Next, the grouped K values in the look-up table are noted. Two groups around K1 are extracted (step S1907). For example, when the look-up table has 256 grayscales, and 17 levels, and K1 is 20, a group in which K=16 and a group in which K=32 are extracted. One group having a lesser K value is referred to as Ka, and the other one having a greater K value is referred to as Kb. For each of the groups Ka and Kb, linear interpolation is performed by using CMY values. In particular, conventional three-dimensional linear interpolation can be used (steps S1908 and S1909). After that, in step S1910, for the result of linear interpolation for the groups Ka and Kb, one-dimensional linear interpolation is performed by using values in groups Ka and Kb. In other words, based on L*a*b* values for C, M, Y, and Ka, and L*a*b* values for C, M, Y, and Kb, one-dimensional linear interpolation is performed.

As described above, the pixel levels are output as L*a*b* data. In addition, if it is determined in step S1911 that the processing has not been performed for all the pixel data, the process returns to step S1905 and repeats the processing. If it is determined that the processing has been performed all the pixel data, the process ends.

Note that profiles other than ICC profiles or other comparable methods or systems within the spirit and scope of the present invention may be employed.

Step S1704: Calculation of Representative Values by Clustering

In step S1704, representative values are calculated by clustering. In this context, the word "clustering" means the process of classifying data items into a predetermined number. All pixel data converted to the absolute color space of L*a*b* is subjected to clustering.

Figure 20:
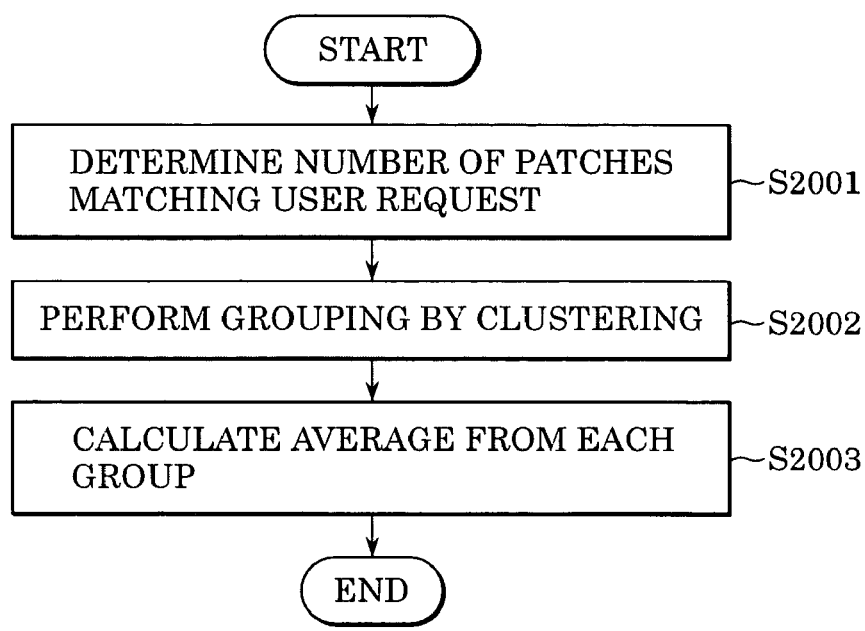
FIG. 20 is a flowchart showing a representative value calculating process in the second embodiment by utilizing the clustering.

FIG. 20 is a flowchart showing a representative value calculating process in the second embodiment by utilizing clustering.

In step S2001, the number of patches is determined based on the information received in step S1702. For example, in the example of the user interface screen shown in FIG. 18, when the triangular pointer is positioned at the leftmost position, the number of patches is set to five. The number of patches is incremented by five when the triangular pointer is moved to the right every one level. When the triangular pointer is positioned at the rightmost position, the number of patches is set to 75. The number of patches may be linearly increased in accordance with levels defined by the user. Alternatively, by analyzing the user definition and pixel distribution, the optimal number of patches may be set.

In step S2002, clustering is performed. A conventional clustering method may be used. For example, hierarchical clustering typified by a median method may be performed, or nonhierarchical clustering in which an initial value is given and switched may be used. In this operation, all the pixel data are classified into clusters, whose number is the number of patches.

In step S2203, an average in each cluster is calculated. All the pixel data are classified into the number determined in step S2001 by the processing of step S2002. Accordingly, each average of the classified values is calculated. The calculated average is a representative value (reference value) in the corresponding cluster, and the number of averages is the number of patches.

Step 1705: Conversion to Output Color Space

In step S1705, the L*, a*, and b* values calculated in step S1704 are converted to values in the output color space of the output device. In step S1705, values in the look-up table for output are used to perform the data conversion. In particular, a destination profile is used. Even if input data and output data theoretically have equal L*, a*, and b* values, it is often the case that their actual values differ if the K values differ. Thus, patch data is generated based on a look-up table used in a printing process. In this case, input data has three-dimensional data of L*, a*, and b*. Accordingly, by finding L*, a*, and b* values close to the input L*, a*, and b* values, and performing three-dimensional linear interpolation by using C, M, Y, and K values corresponding to the found L*, a*, and b* values, conversion to the output color space is performed. As described above, CMYK patches are generated.

Second Embodiment as Modified for User Marking

Although the above-described second embodiment allows the user to determine the color reproduction accuracy and the processing speed by using the user interface shown in FIG. 18, the user may request correction of only a particular portion of an image. The following describes a modification of the second embodiment in order to cope with the above case.

Figure 21:
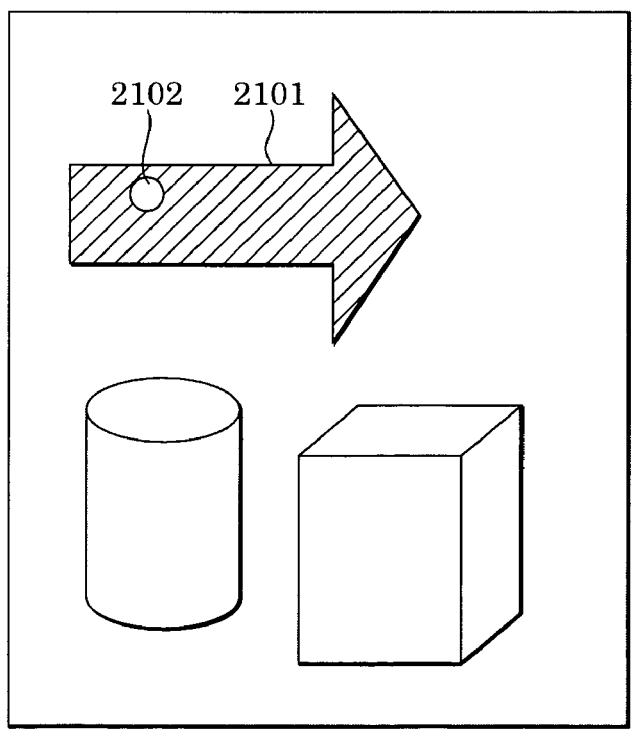
FIG. 21 is an illustration of an example of a user interface screen for designating a particular portion of an image.

When the user request is received in step S1702, and a particular object region of an image needs correction, the user is allowed to mark the region. One example is shown in FIG. 21. For example, it is assumed that the user wishes to correct a printed color of an arrow-shaped figure object 2101 at the top left. In this case, a circle mark 2102 is added to the figure object 2101. The mark may have any shape other than the circle.

Figure 22:
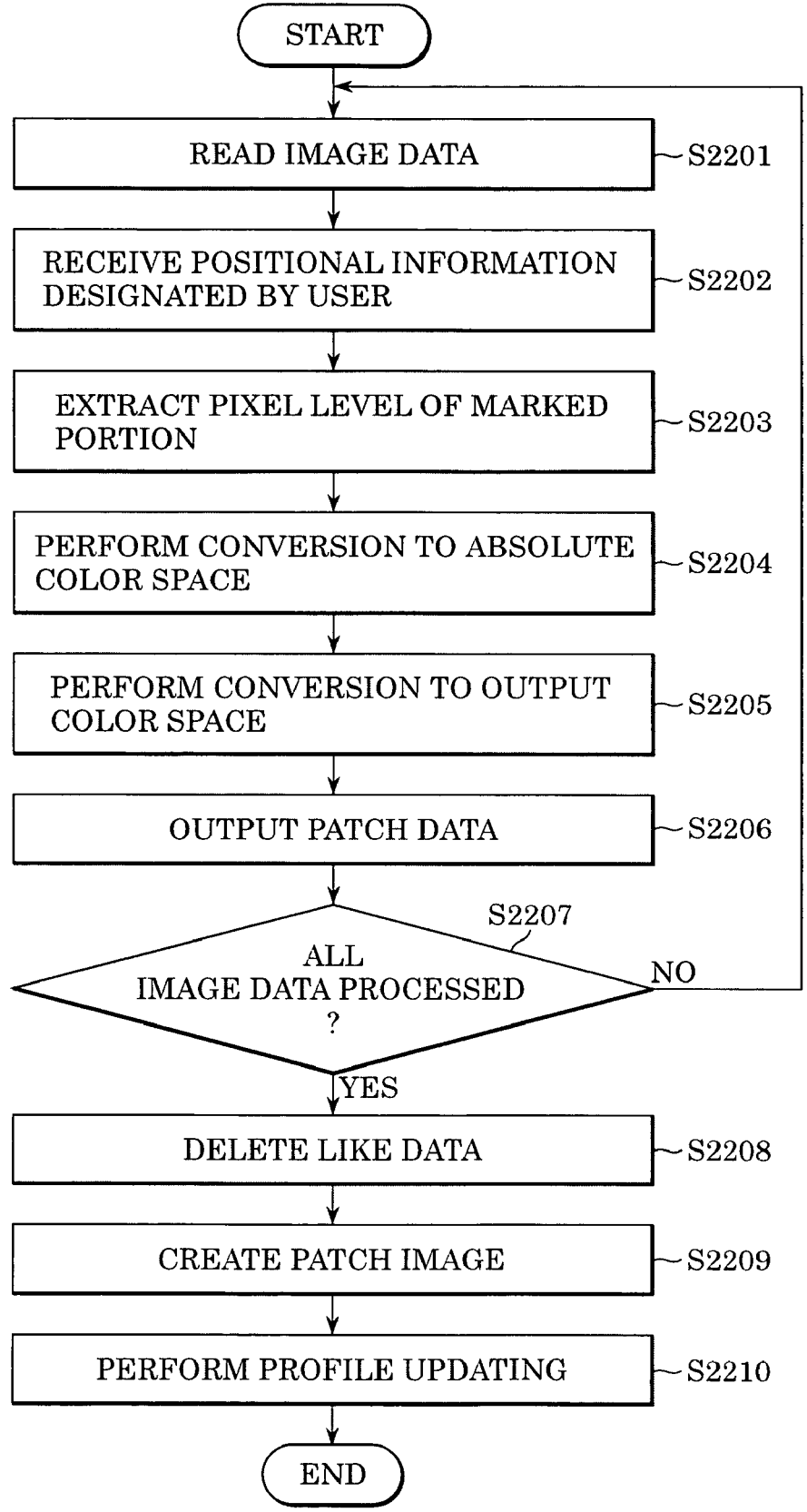
FIG. 22 is a flowchart showing an example of processing for creating a profile which matches a particular image portion designated by a user.

An actual processing flow is shown in FIG. 22. A program corresponding to this flowchart is included in the color management program installed in the HDD 4 in the management PC 104. This program is loaded into the RAM 3 and is executed by the CPU 1.

In step S2201, image data which is output in response to a user's instruction is read from, for example, the client PC 105. In step S2202, positional information (the figure object 2101 of FIG. 21) of the object region (to which the mark 2102 is added) designated by the user is received. In step S2203, pixel levels of the image object to which the mark 2102 is added are extracted.

The process proceeds to step S2204, and the extracted pixel levels are converted to values in the absolute color space. The values in the absolute color space are calculated by interpolation using a look-up table of the source profile. After that, in step S2205, the values in the absolute color space are converted into pixel levels in an output color space. The pixel levels in the output color space are calculated by interpolation using a look-up table of the destination profile. In step S2206, patch data is output.

Next, in step S2207, it is determined whether processing has been performed for all the extracted image data. If the processing has not performed, the process returns to step S2201. If the processing has been performed, the process proceeds to step S2208.

In step S2208, it is determined whether like data has been generated. If so, the like data is deleted. In step S2209, a patch image is generated. Finally, in step S2210, only L*, a*, and b* values which are close to the extracted pixel levels are subjected to profile updating as described in the first embodiment, after which the process ends.

As described above, the user is allowed to designate a particular portion of an image for which processing is performed. Thus, the processing load required for clustering, etc., can be relatively reduced. In addition, the result of correction is as intended by the user.

The processing for determining the number of patches by using the above-described clustering and the processing for allowing the user to perform marking may be combined.

According to the above-described second embodiment, in the image processing system for outputting image data, by receiving a user request, classifying data on the basis of the received information, and generating patch data from the classified data, optimal patches which match a particular image designated by the user can be created.

In addition, by receiving positional information of an image object designated by the user, classifying data on the basis of the received information, and generating patch data from the classified data, in the particular image designated by the user, patches of a portion for which color correction is to be particularly performed can be created.

As described above, according to the first and second embodiments, color conversion which matches a changing device status as it changes momentarily can be easily performed. This enables the device to constantly output an image in a desired color.

In addition, in the case of outputting the same data by a plurality of devices, the colors of the outputs can be set to be substantially identical.

Other Embodiments

The embodiments of the present invention have been described in detail. The present invention may be applied to a system formed by a plurality of systems, or may be applied to a single system.

The present invention includes a case in which, by providing the program code of software realizing functions of the above-described embodiments to a system or system directly or from a remote place, a computer in the system or system reads and executes the program code. If this case has program functions, it does not need to have a program form.

Therefore, in order for a computer to realize functional processing of the present invention, program code which is installed into the computer, itself, realizes the present invention. In other words, the present invention includes a computer program for realizing functional processing of the present invention.

In this case, any program form can be used, such as object code, a program executed by an interpreter, or script data supplied to an operating system, if it has program functions.

Recording media for providing programs include, for example, a flexible disk, a hard disk, an optical disk, a magneto-optical disk, MO, CD-ROM, CD-R, CD-RW, a magnetic tape, a nonvolatile memory, ROM, and DVD (DVD-ROM, DVD-R).

Regarding a program providing method, by using a browser of a client computer to access a site on the Internet, and downloading, from the site, a computer program of the present invention, or a compressed file including an automatic installing function, to a recording medium such as a hard disk, the program can be provided. In addition, program code constituting the program of the present invention is divided into a plurality of files. Each file may be downloaded from different Web sites to accomplish the objectives of the present invention. In other words, the present invention also includes a WWW server from which program files for realizing functional processing of the present invention are downloaded to plural users.

The present invention is realized such that a program of the present invention is distributed to users in a form encrypted and stored in a recording medium such as CD-ROM, key information for decryption is downloaded from a site through the Internet to each user satisfying predetermined conditions, and the key information is used to execute the encrypted program so that the decrypted program is installed in a computer.

The functions of the above-described embodiments can be realized such that a computer executes a read program. In addition, based on instructions of the program, an OS running on the computer executes all or part of actual processing, whereby the functions of the above-described embodiments can be realized.

After a program read from a recording medium is written in a memory in an add-in board inserted into a computer or add-in unit connected to the computer, based on instructions of the program, a CPU or the like in the add-in board or add-in unit executes all or part of actual processing, whereby the functions of the above-described embodiments are realized.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-412213 filed Dec. 10, 2003, which is hereby incorporated by reference herein.

What is claimed is:

1. An image processing system comprising:
output means for allowing an output device to output patch-data items of plural multi-order colors;
acquiring means for acquiring color values, in an absolute color space, of the patch-data items output from the output device;
reference-value calculating means for calculating reference values by converting the plural multi-order colors based on a first color conversion table containing correspondence between a color space based on the output device and the absolute color space;
difference calculating means for calculating differences between the color values acquired by the acquiring means and the reference values, which correspond thereto and weighting the calculated differences with the differences between lattice point data, in the absolute color space, extracted from the first color conversion table and the calculated reference values; and
correcting means for correcting, based on the differences calculated by the difference calculating means, a second color conversion table containing correspondence between the absolute color space and an output color space based on the output device.

2. The image processing system according to claim 1, further comprising:
input means for inputting image data;
designating means for designating a user-desired object region in the input image data; and
patch-data generating means for generating the patch data items based on the designated object region.

3. The image processing system according to claim 1, further comprising smoothing means for smoothing each of the differences calculated by the difference calculating means.

4. The image processing system according to claim 1, further comprising:
input means for inputting image data;
receiving means for receiving a user request concerning one of color-reproduction accuracy and processing speed; and
patch-data generating means for generating the patch data items based on the image data and the user request.

5. The image processing system according to claim 4, wherein the patch-data generating means includes:
setting means for setting the number of patch data items in response to the user request;
clustering means for performing clustering which divides pixels constituting the image data into clusters, whose number is the set number of patch data items; and
cluster reference value calculating means for calculating a reference value for the patch data items in each of the clusters.

6. An image processing method comprising:
an output step of allowing an output device to output patch-data items of plural multi-order colors;
an acquiring step of acquiring color values, in an absolute color space, of the patch-data items output from the output device;
a reference-value calculating step of calculating reference values by converting the plural multi-order colors based on a first color conversion table containing correspondence between a color space based on the output device and the absolute color space;
a difference calculating step of calculating differences between the color values acquired in the acquiring step and the reference values, which correspond thereto and weighting the calculated differences with the distance between the lattice point data, in the absolute color space, extracted from the first color conversion table and the calculated reference values; and
a correcting step of correcting, based on the differences calculated in the difference calculating step, a second color conversion table containing correspondence between the absolute color space and an output color space based on the output device.

7. A computer-readable storage medium storing computer program for executing an image processing method according to claim 6.

8. The image processing method according to claim 7, further comprising:
an input step of inputting image data;
a designating step of designating a user-desired object region in the input image data; and
a patch-data generating step of generating the patch data items based on the designated object region.

9. The image processing method according to claim 7, further comprising a smoothing step of smoothing each of the differences calculated in the difference calculating step.

10. The image processing method according to claim 7, further comprising:

an input step of inputting image data;

a receiving step of receiving a user request concerning one of color-reproduction accuracy and processing speed; and a patch-data generating step of generating the patch data items based on the image data and the user request.

11. The image processing method according to claim 10, wherein the patch-data generating step includes the steps of:

a setting step of setting the number of patch data items in response to the user request;

a clustering step of performing clustering which divides pixels constituting the image data into clusters, whose number is the set number of patch data items; and a cluster reference value calculating step of calculating a reference value for the patch data items in each of the clusters.

12. A color management system comprising:

an output unit configured to allow an output device to output patch-data items of plural multi-order colors;

an acquiring unit configured to acquire color values, in an absolute color space, of the patch-data items output from the output device;

a reference-value calculating unit configured to calculate reference values by converting the plural multi-order colors based on a first color conversion table containing correspondence between a color space based on the output device and the absolute color space;

a difference calculating unit configured to calculate differences between the color values acquired by the acquiring unit and the reference values which correspond thereto and weighting the calculated differences with the distance between lattice point data, in the absolute color space, extracted from the first color conversion table and the calculated reference values; and a correcting unit configured to correct, based on the differences calculated by the difference calculating unit, a second color conversion table containing correspondence between the absolute color space and the output color space based on the output device.

* * * * *